United States Patent
Hynecek et al.

(10) Patent No.: US 10,728,372 B2
(45) Date of Patent: Jul. 28, 2020

(54) HOLDER FOR A MOBILE ELECTRONIC DEVICE

(71) Applicant: Samsonite IP Holdings S.àr.l., Luxembourg (LU)

(72) Inventors: Bryan Lee Hynecek, Redwood City, CA (US); Mia Hutchinson, San Mateo, CA (US); Joyce Kung, San Francisco, CA (US); Colin Reed, San Francisco, CA (US); Minna Chong, Oakland, CA (US); Darrick Del Moral, San Bruno, CA (US); Sean Ng Pack, San Francisco, CA (US); Lizzie Wright, San Francisco, CA (US)

(73) Assignee: Samsonite IP Holdings S.àr.l., Luxembourg (LU)

( * ) Notice: Subject to any disclaimer, the term of this patent is extended or adjusted under 35 U.S.C. 154(b) by 0 days.

(21) Appl. No.: 16/240,191

(22) Filed: Jan. 4, 2019

(65) Prior Publication Data
US 2020/0068056 A1    Feb. 27, 2020

Related U.S. Application Data

(63) Continuation-in-part of application No. 16/107,781, filed on Aug. 21, 2018.

(51) Int. Cl.
*H04M 1/04* (2006.01)
*H04M 1/02* (2006.01)
*H04M 1/12* (2006.01)

(52) U.S. Cl.
CPC ........... *H04M 1/04* (2013.01); *H04M 1/0256* (2013.01); *H04M 1/12* (2013.01)

(58) Field of Classification Search
CPC .... H04B 1/3888; H04B 1/385; H04B 1/3877; H04B 2001/3855; H04B 2001/3861;
(Continued)

(56) References Cited

U.S. PATENT DOCUMENTS

| 9,548,785 B2 * | 1/2017 | Rayner | H05K 5/061 |
| 2009/0173863 A1 * | 7/2009 | Crown | B60R 11/0241 248/316.4 |

(Continued)

FOREIGN PATENT DOCUMENTS

| CA | 2831048 C * | 10/2015 | F16M 13/04 |
| DE | 29618476 U1 | 12/1996 | |
| DE | 102008053975 A1 | 5/2010 | |

OTHER PUBLICATIONS

"IGUY 9.7-Inch Ipad Cases", web, as published as of Aug. 2019, <https://www.speckproducts.com/apple/ipad-cases/ipad-pro-9-7-cases/iguy-ipad-pro-9-7-cases/776412479.html>, pp. 1-3.
(Continued)

*Primary Examiner* — George Eng
*Assistant Examiner* — Jing Gao
(74) *Attorney, Agent, or Firm* — Lerner, David, Littenberg, Krumholz & Mentlik, LLP

(57) ABSTRACT

A holder for holding a mobile electronic device to an object, the holder having two first openings, a first communication path, two second openings, and a second communication path. The two first openings form a first set of openings. The first communication path connects the first openings so a securing device can be fed into one of the first openings and out of the other of the first openings. The two second openings form a second set of openings. The second communication path connects the second openings so that the securing device can be fed into one of the second openings and out of the other of the second openings. The first openings are spaced apart from the second openings so the securing device can be secured to the holder at the first and second sets of openings, and additionally wrapped around the object to secure the holder thereto.

16 Claims, 52 Drawing Sheets

(58) Field of Classification Search
CPC .......... H04B 2001/3866; A45C 13/002; A45C 2011/002; A45C 13/30; A45C 2013/026; A45C 13/02; A45F 5/00; A45F 2200/0516; A45F 2005/006; A45F 5/02; A45F 2005/008; A45F 2200/0525; A45F 2003/003; A45F 2003/142; A45F 3/02; A45F 3/04; A45F 3/14; A45F 5/021; A45F 2003/001; A45F 2200/0508; A45F 2200/055; A45F 2003/025; A45F 2003/045; A45F 2004/003; A45F 2005/002; A45F 2200/05; A45F 3/005; B60R 11/0241; B60R 11/0252; B60R 2011/0017
See application file for complete search history.

(56) References Cited

U.S. PATENT DOCUMENTS

| | | | | |
|---|---|---|---|---|
| 2010/0264181 A1* | 10/2010 | Gray | .................... | B60N 2/2812 224/409 |
| 2012/0152990 A1* | 6/2012 | Kulas | ........................ | A45F 5/00 224/222 |
| 2012/0314354 A1* | 12/2012 | Rayner | .................. | H05K 5/061 361/679.01 |
| 2013/0241381 A1* | 9/2013 | Hynecek | .............. | H05K 5/0217 312/240 |
| 2015/0195392 A1* | 7/2015 | Nissenbaum | ........... | H04M 1/04 455/569.1 |

OTHER PUBLICATIONS

"IGUY 9.7-Inch Ipad Pro Cases", web, as published as of Jun. 2017, <https://web.archive.org/web/20170629165752/http://www.speckproducts.com/apple/ipad-cases/ipad-pro-9-7-cases/iguy-ipad-pro-9-7-cases/IPP9-IG.html>, pp. 1-3.

"IPad Pro Cases—iPad Pro Covers—Speck", web, as published as of Jun. 2017, <https://web.archive.org/web/20170606121641/http://www.speckproducts.com/apple/ipad-cases/ipad-pro-cases.html>, pp. 1-15.

European Search Report for Application No. EP20150216, dated Mar. 30, 2020, 3 pages.

* cited by examiner

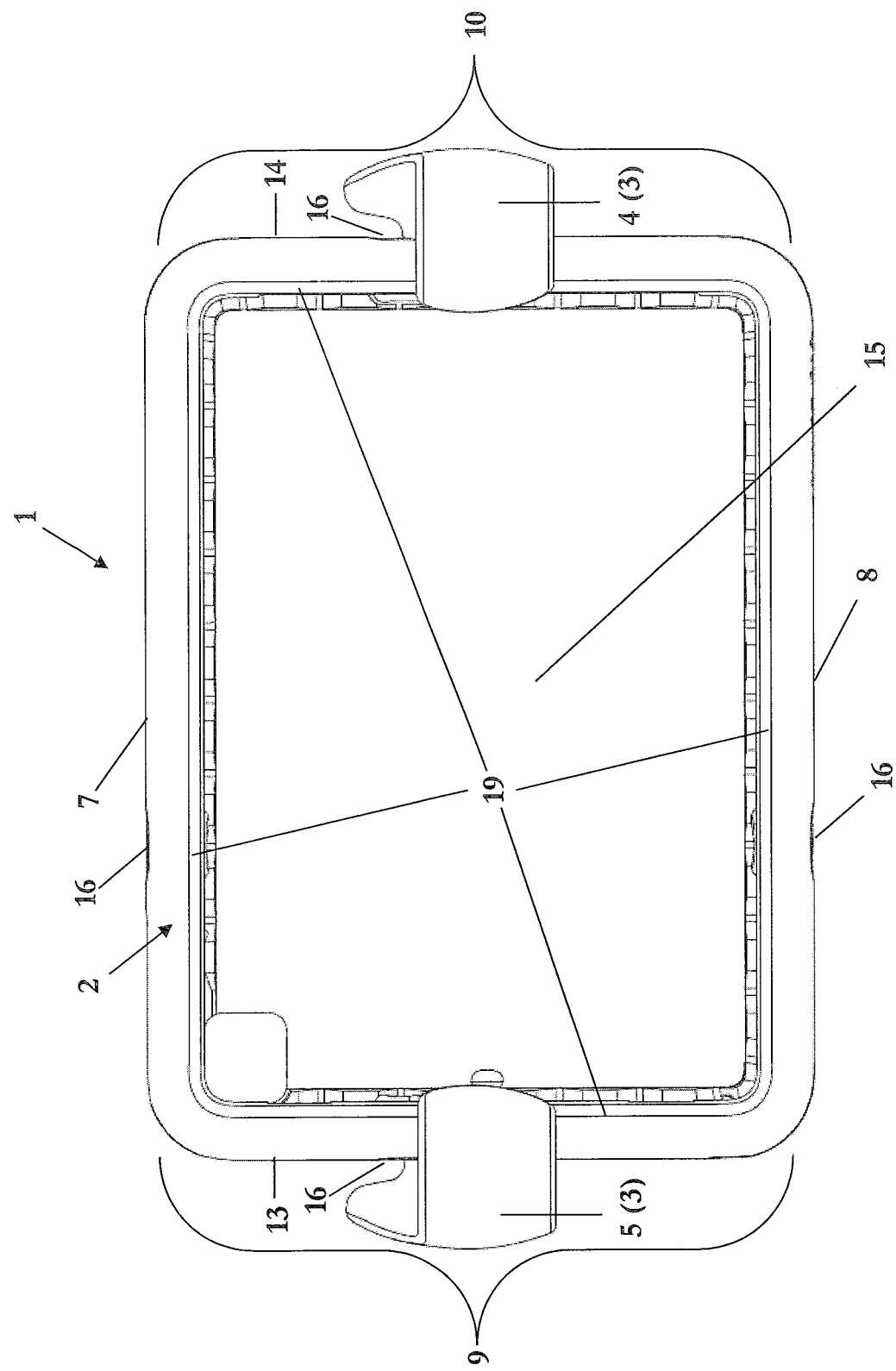

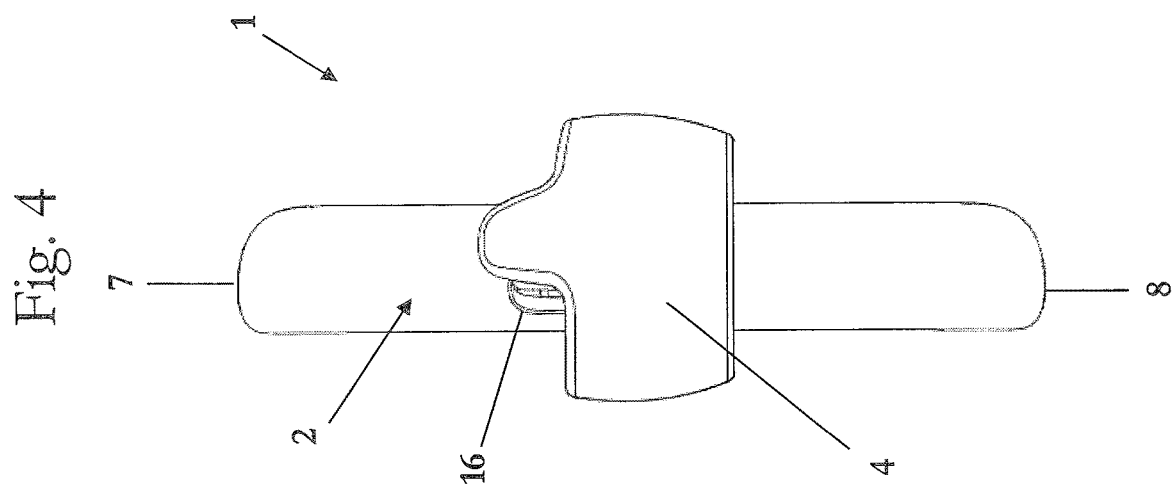
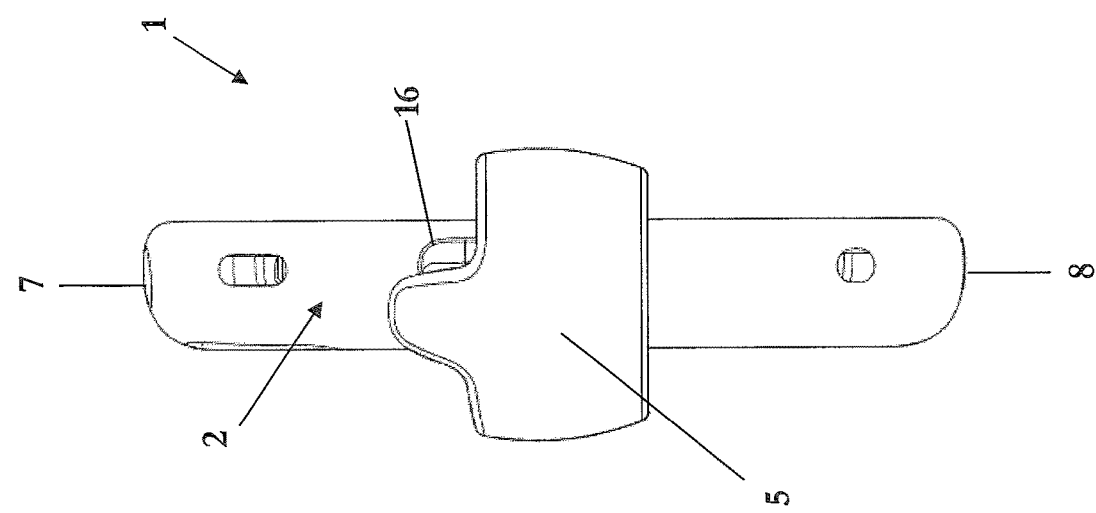

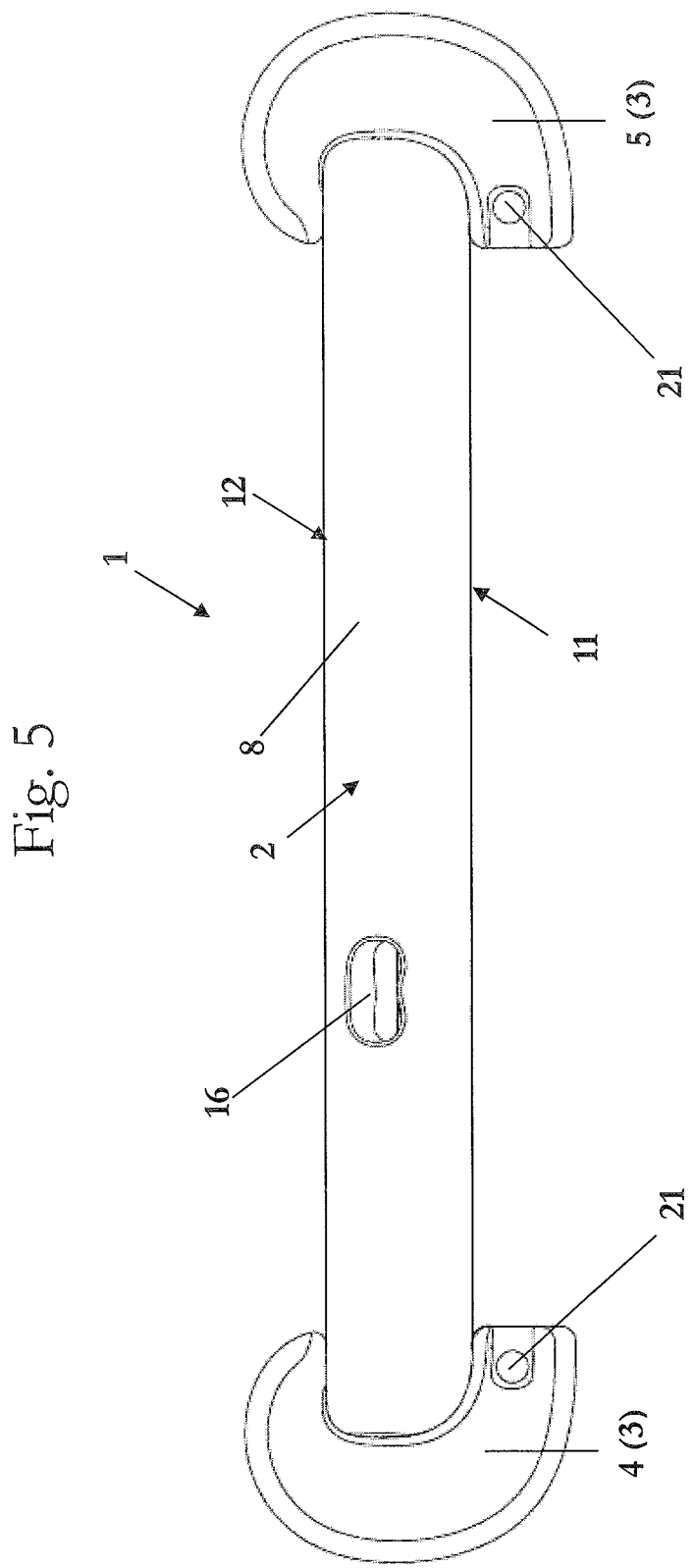

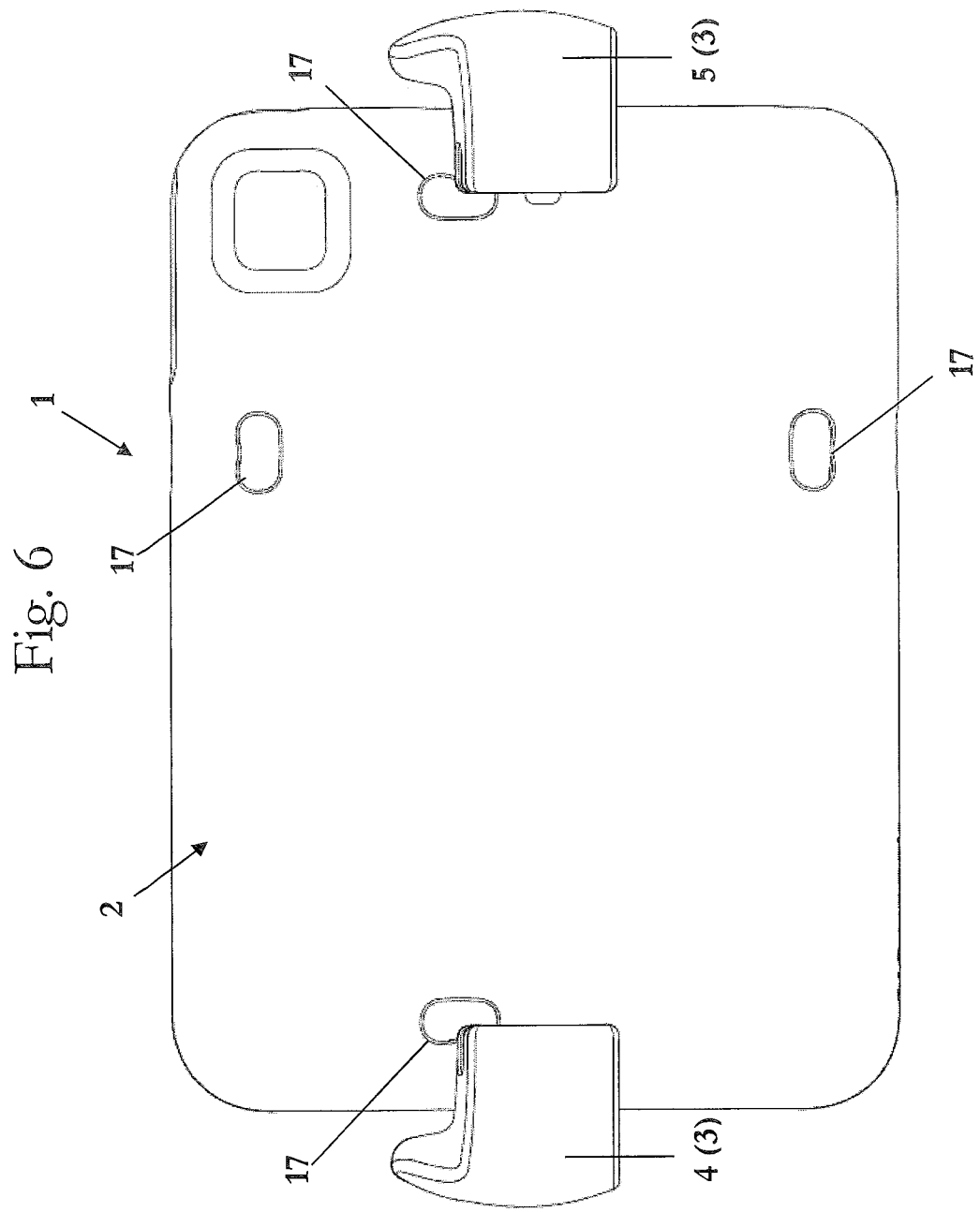

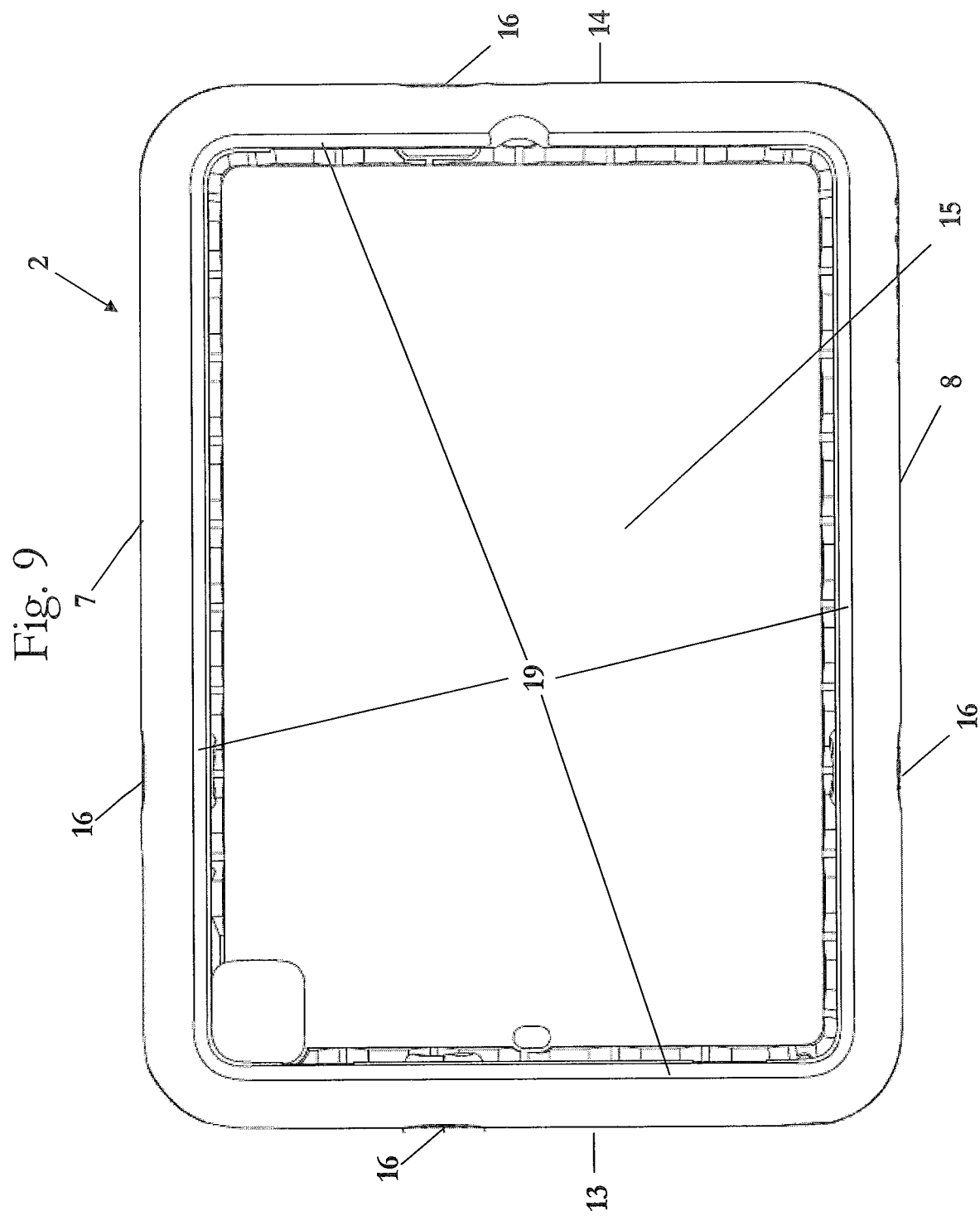

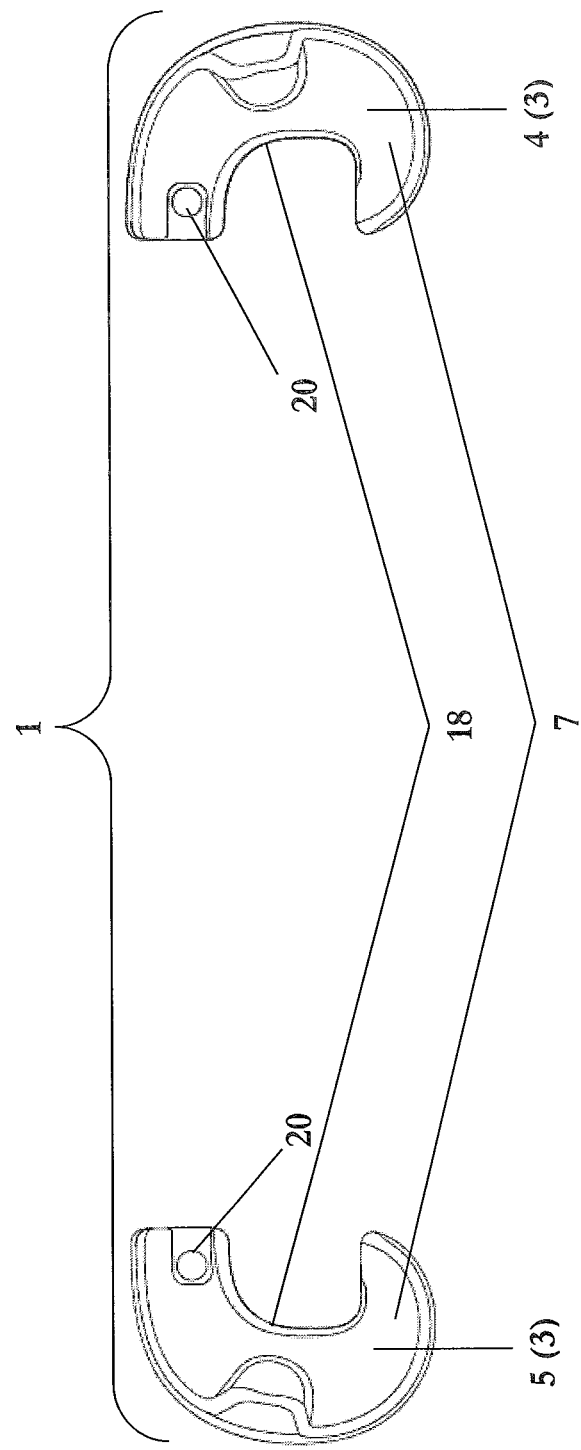

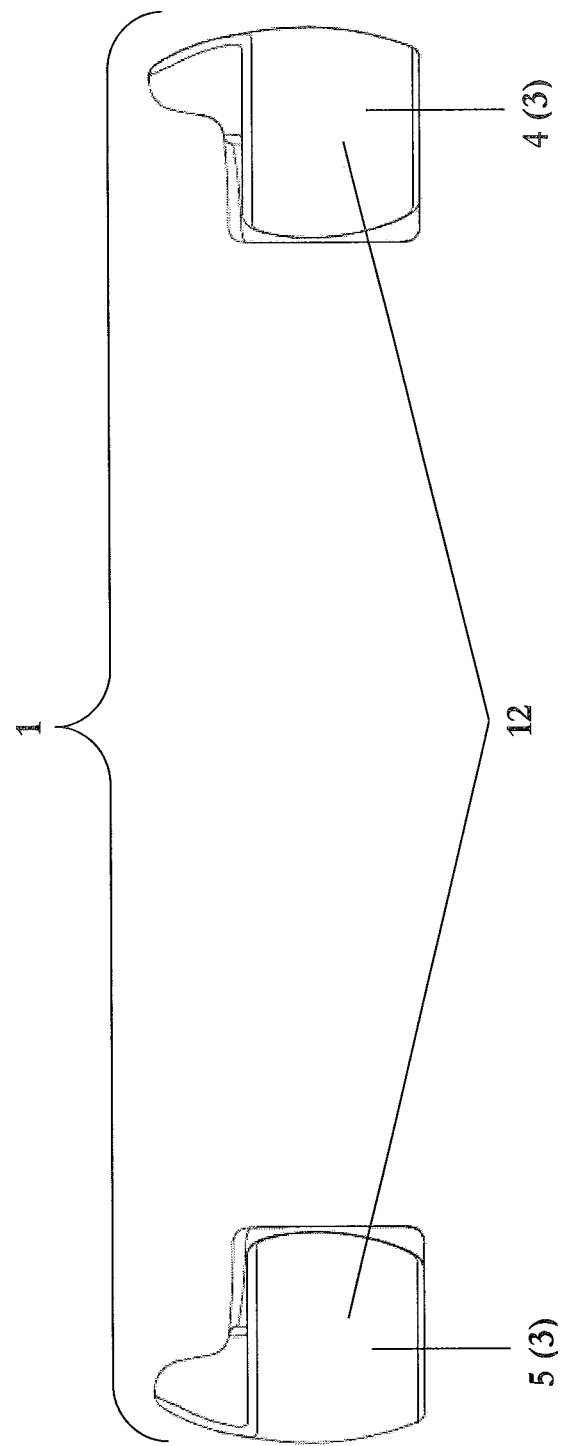

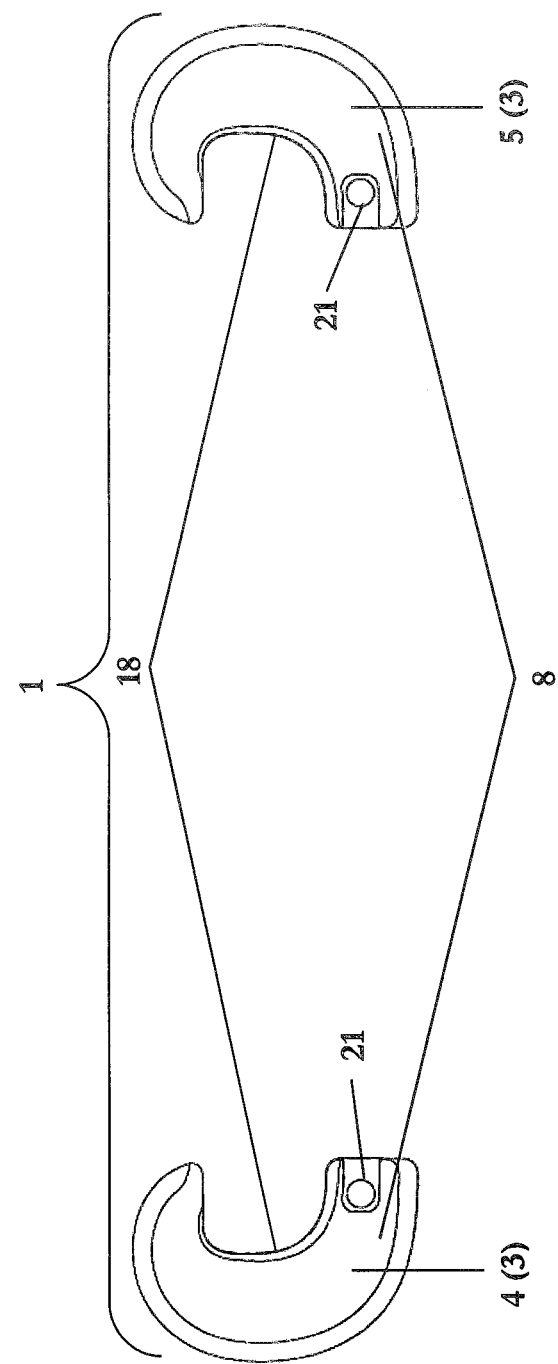

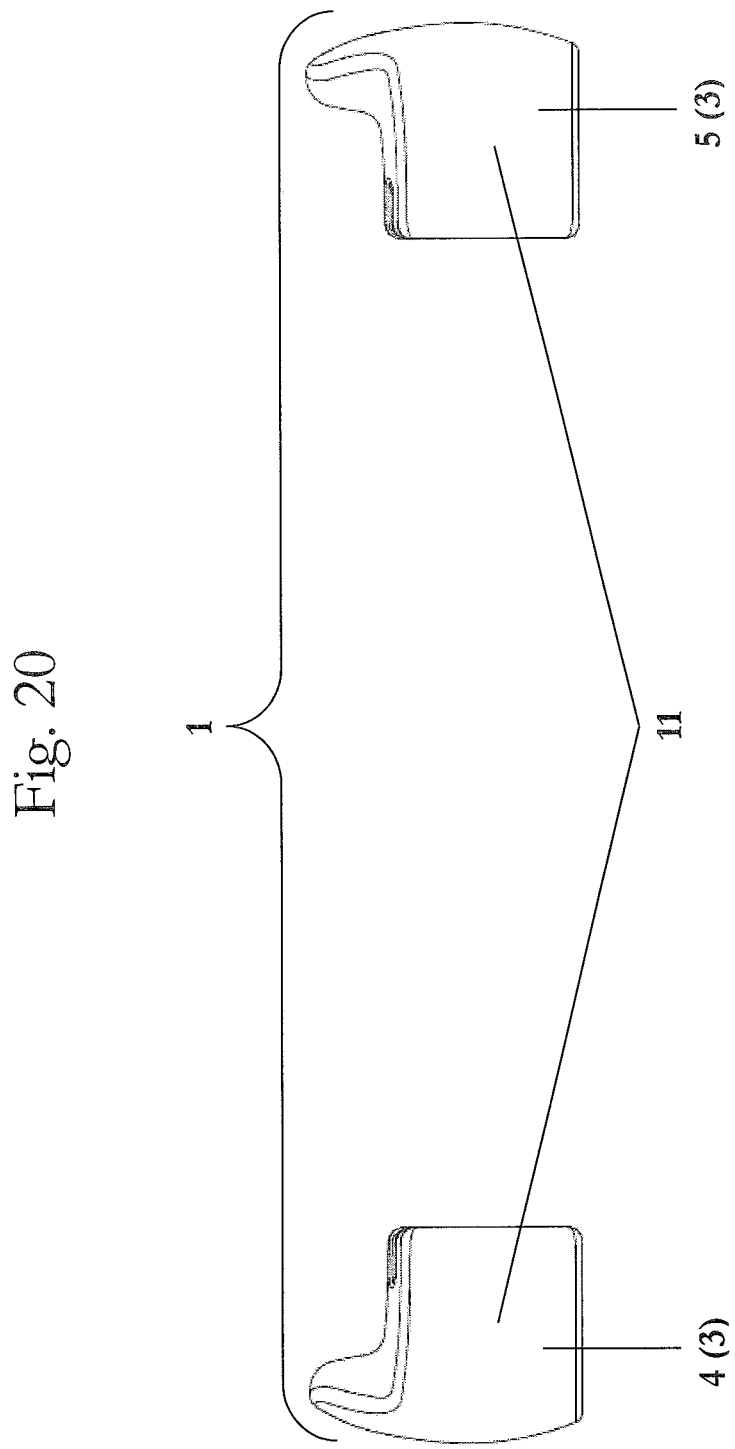

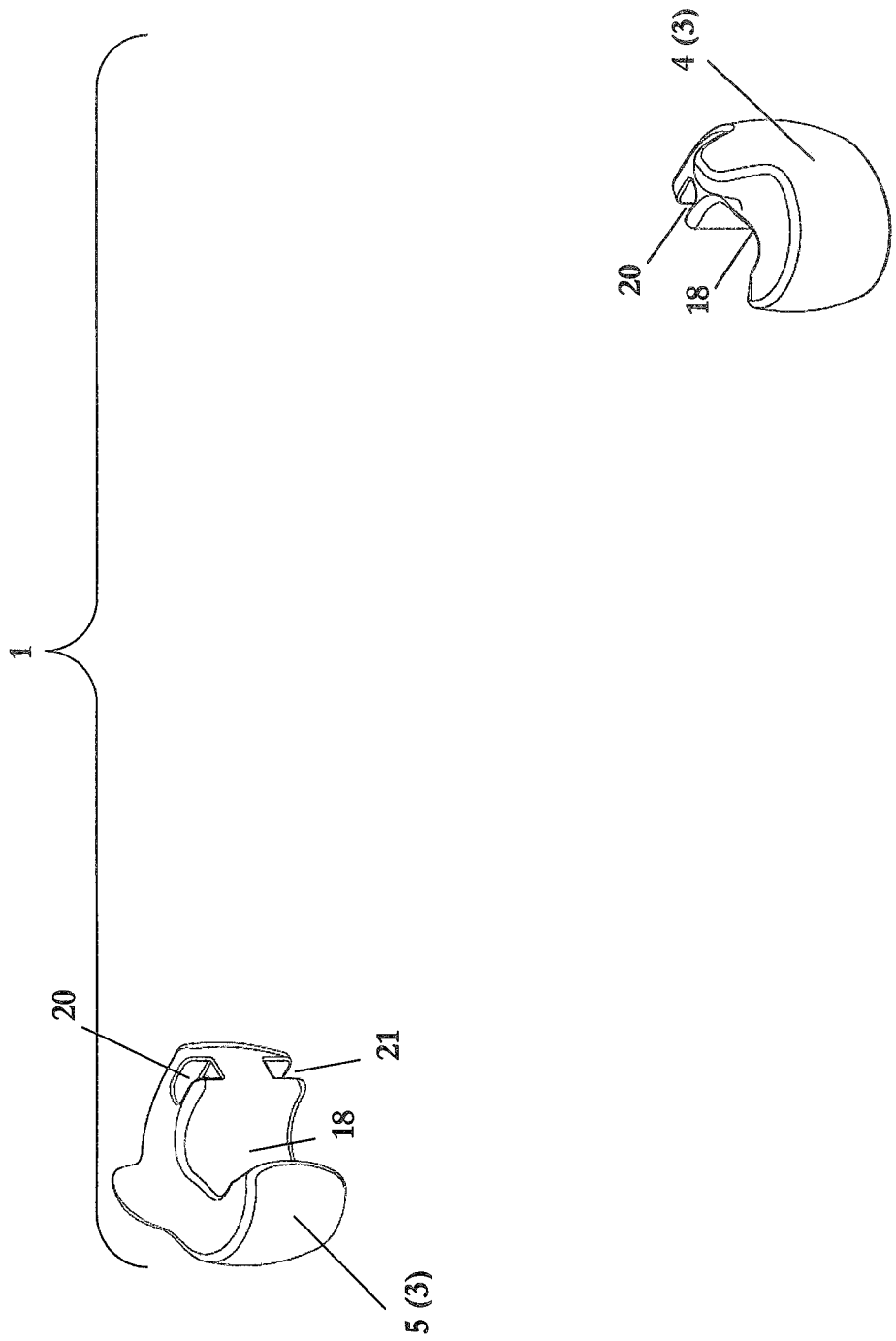

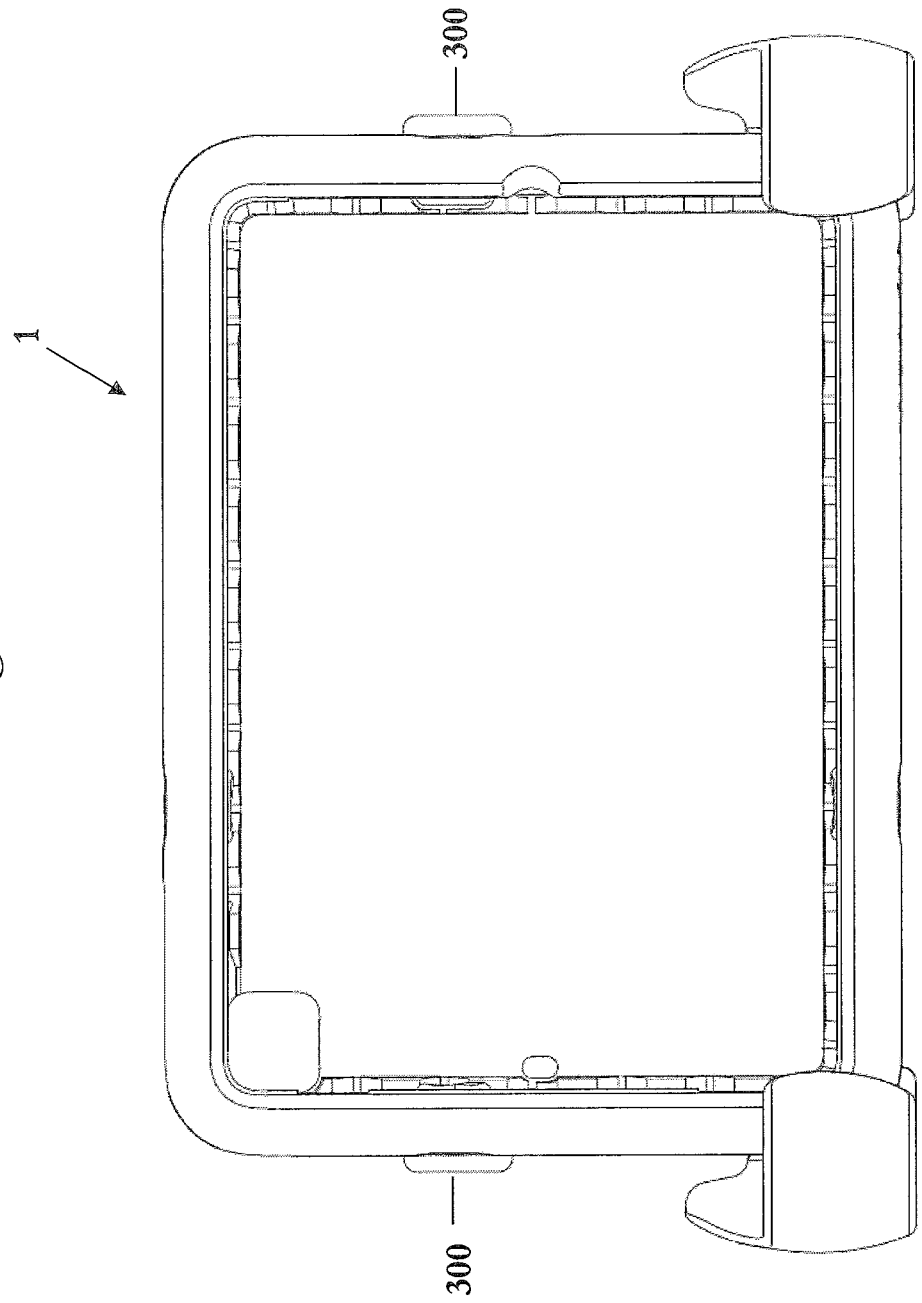

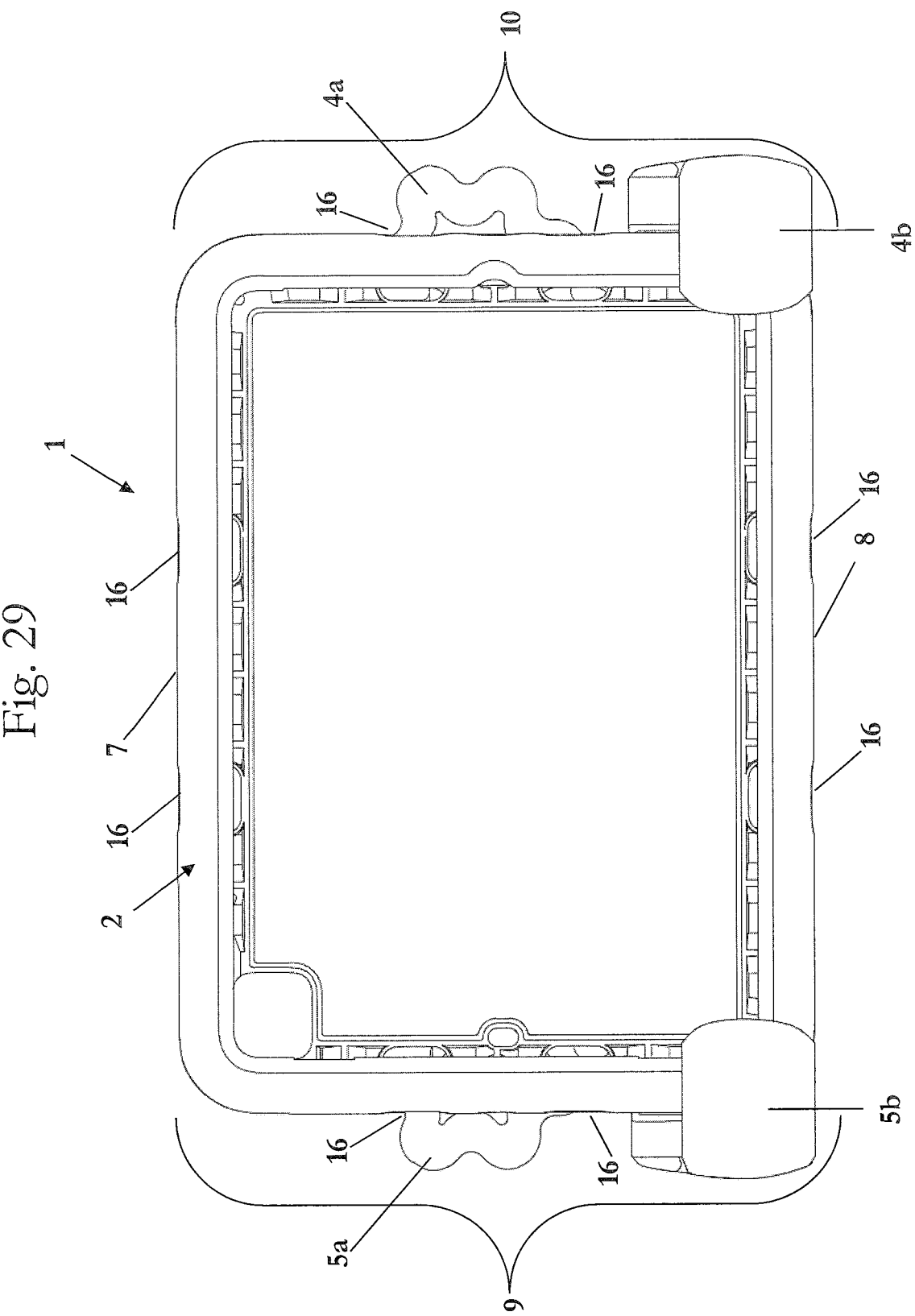

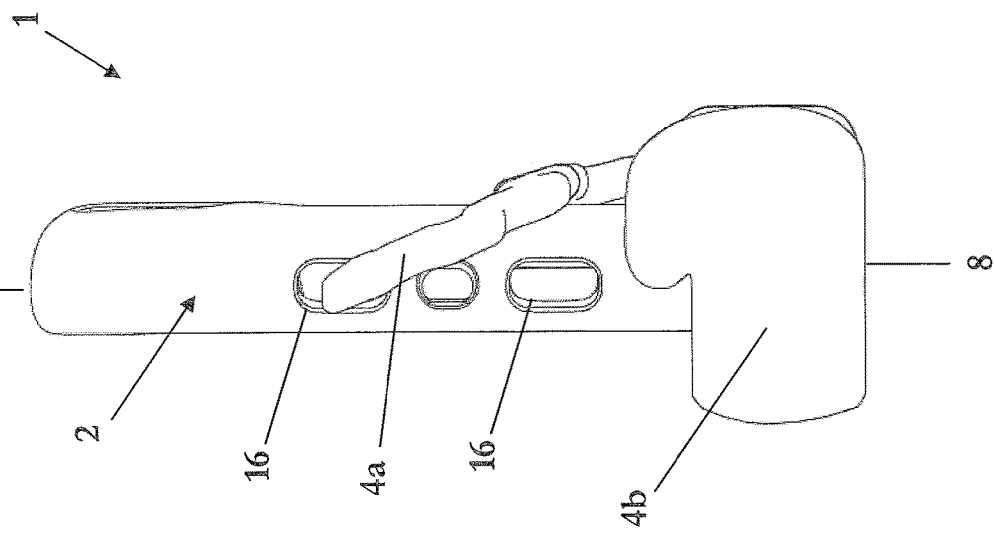
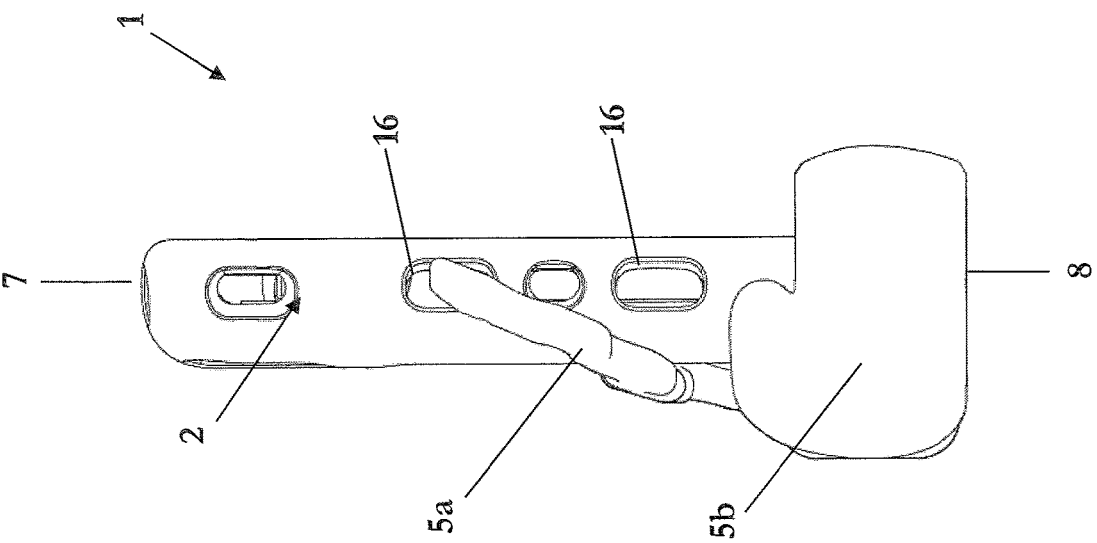

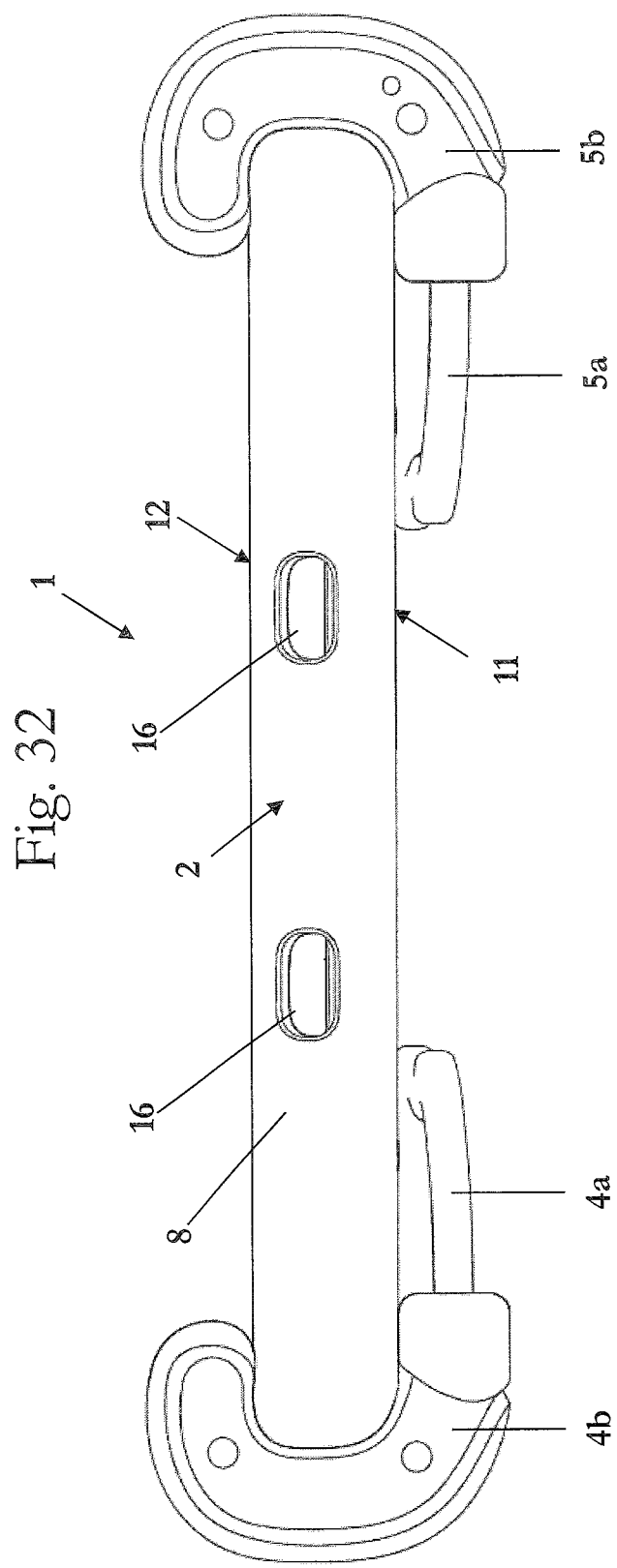

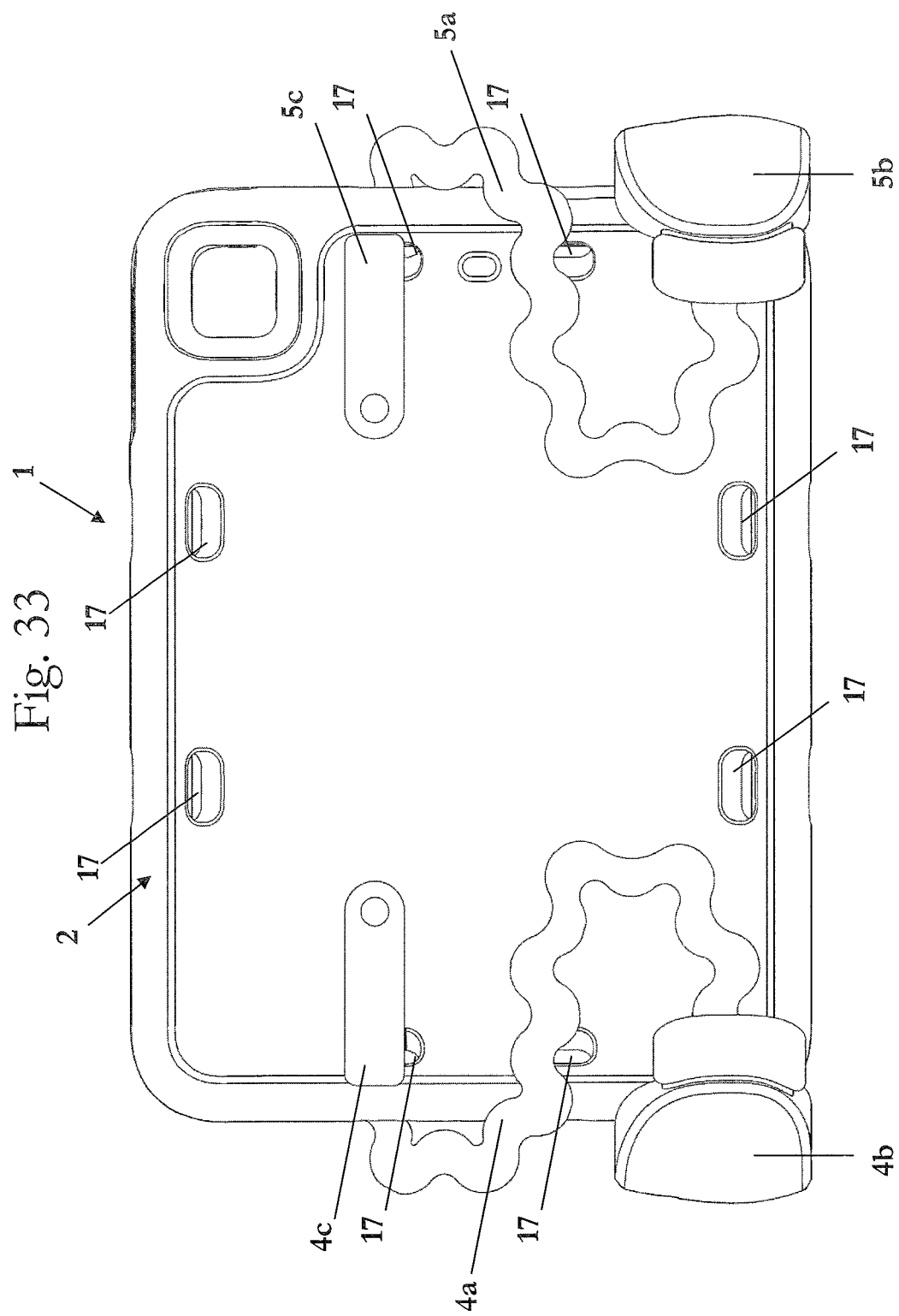

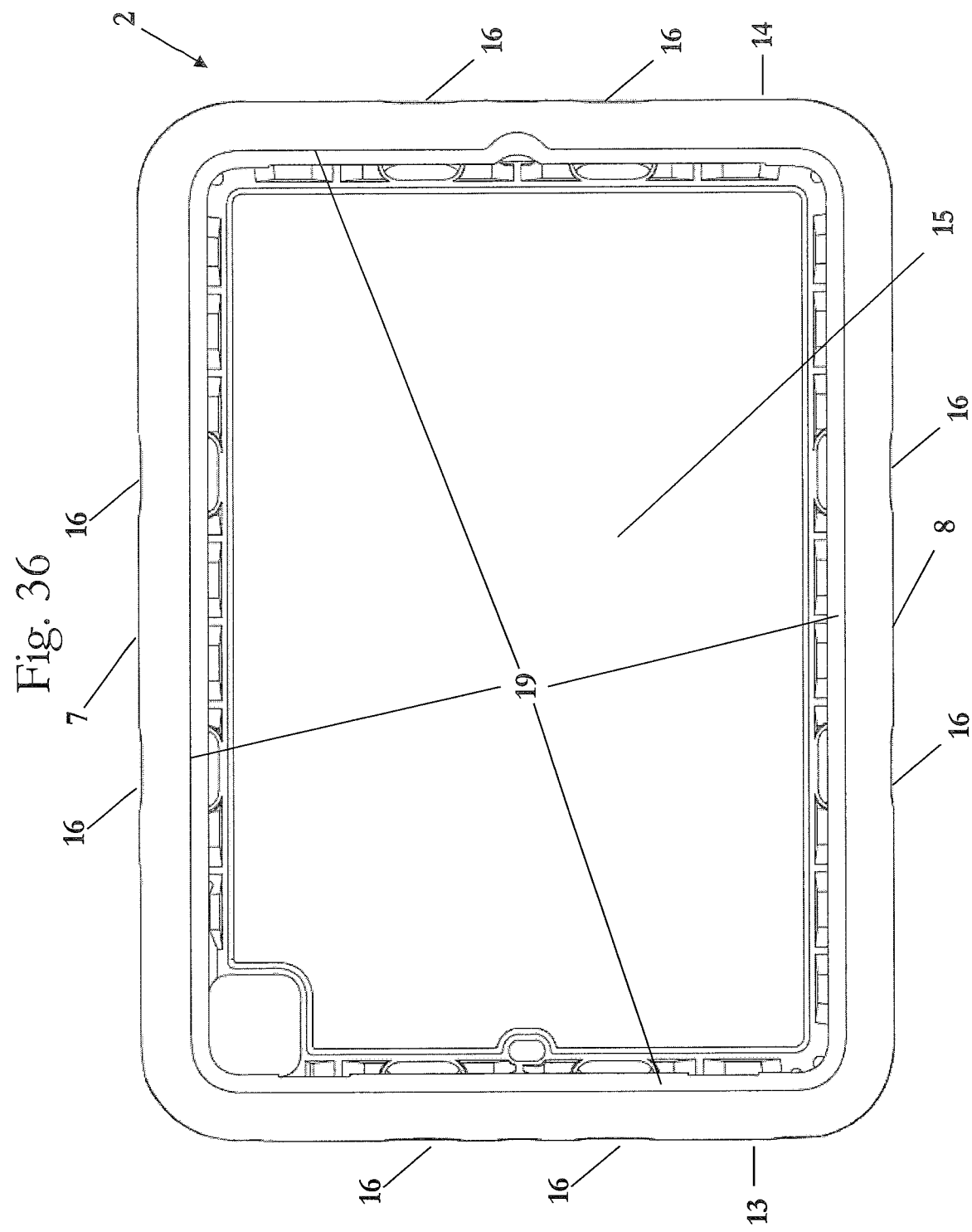

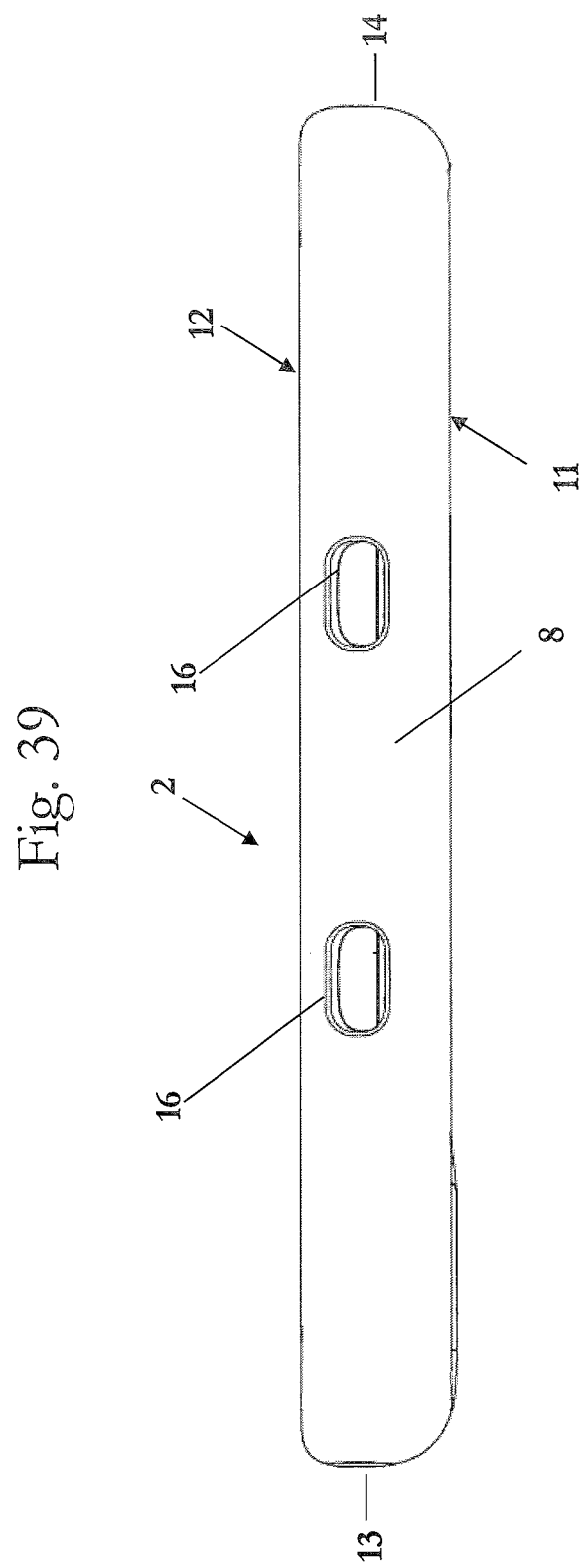

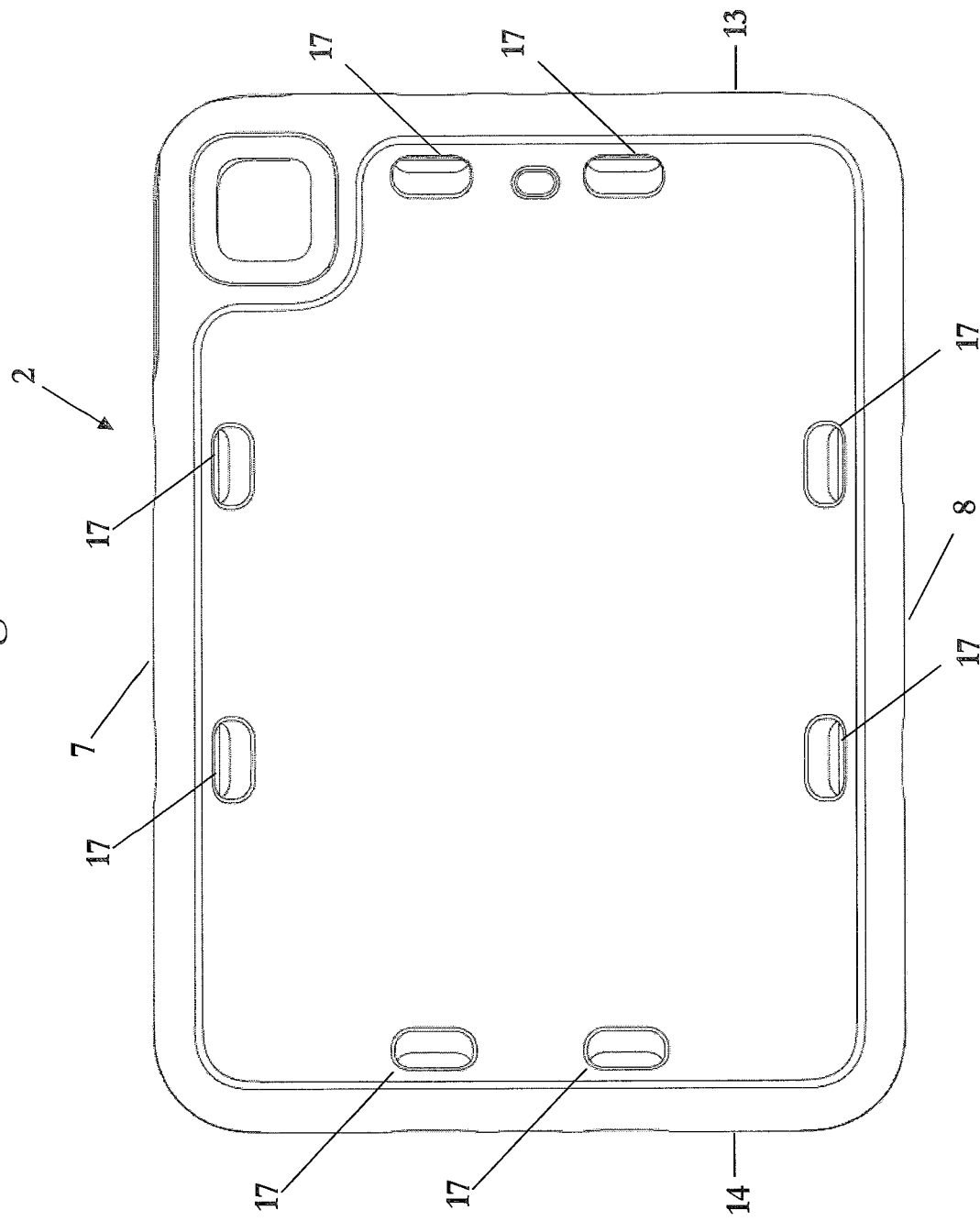

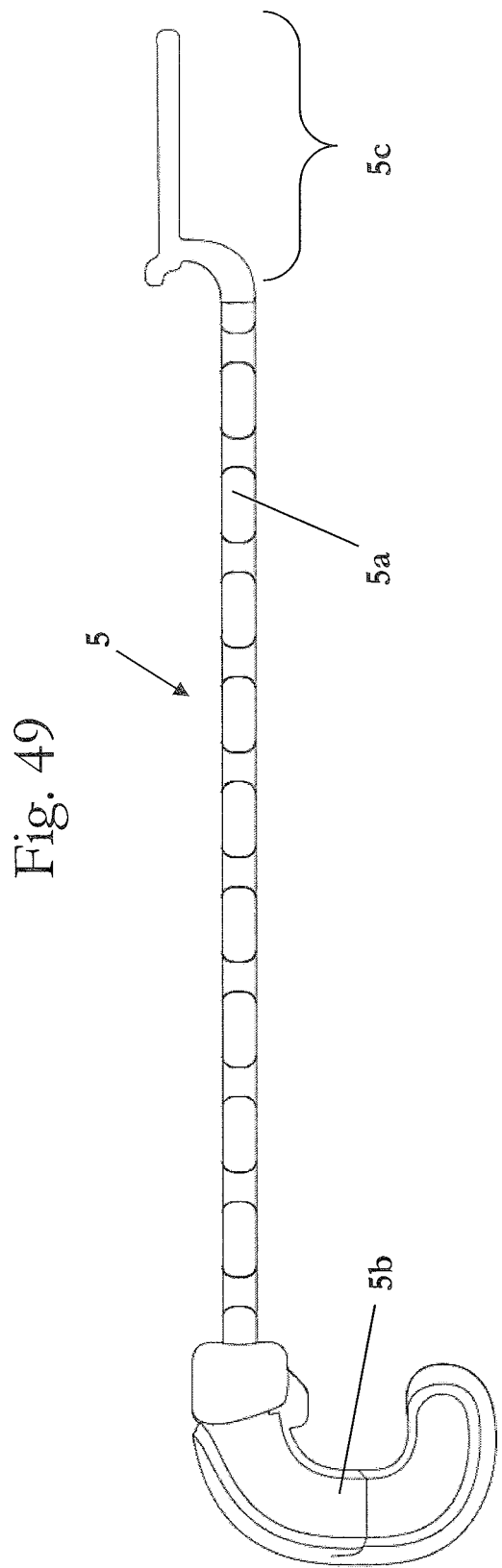

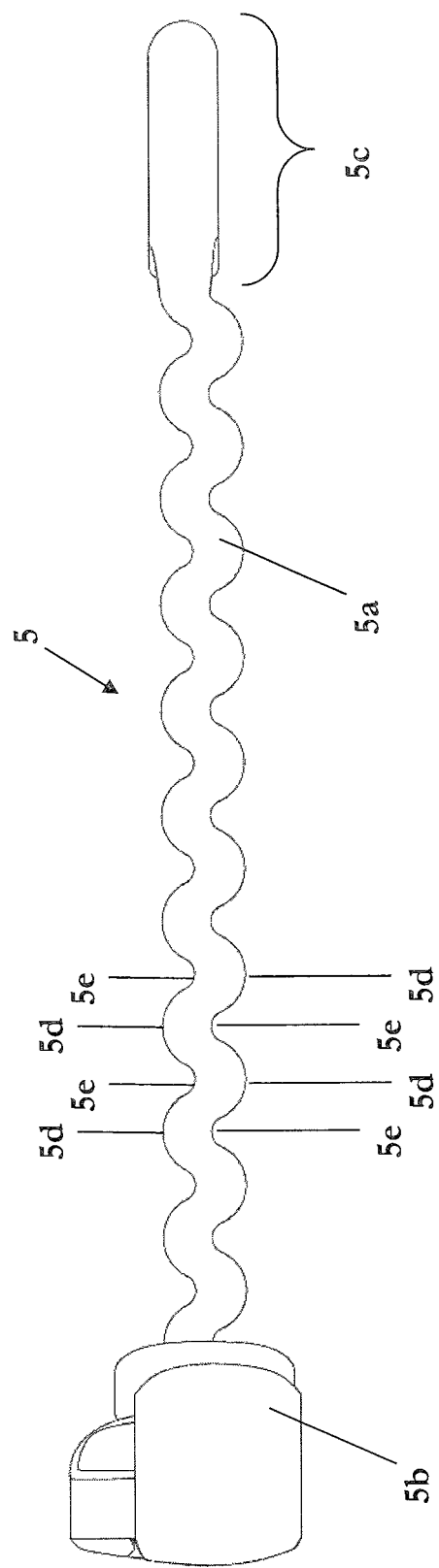

HOLDER FOR A MOBILE ELECTRONIC DEVICE

The current application is a continuation-in-part of U.S. patent application Ser. No. 16/107,781 filed on Aug. 21, 2018, the disclosure of which is incorporated herein by reference in its entirety.

FIELD OF THE INVENTION

The present invention relates to a holder for a mobile electronic device. The holder is configured to clamp and secure the mobile electronic device to an object that may periodically be in motion, such as a car headrest. The holder can be formed from a single unitary piece, or from multiple distinct pieces. Preferably, the holder encases a perimeter of the mobile electronic device so as to protect the mobile device in an impact event, such as a fall or drop.

Holders for mobile devices can take many forms. For instance, easel holders allow a user to place a mobile device in a standing position on a horizontal surface. But such easel holders are unsuitable for horizontal surfaces that may periodically move, as they are prone to falling or collapse when the surface changes speed or changes from a stationary state to a moving state.

There are also holders designed to attach to specific areas of moving objects, such as car cup holders, car dashboards, car vents, and the like. But these portion of these holders that are designed to attached to the moving object are often object-specific and so can only be attached to that specific object. Some holders even will only attach to a specific vehicle, such as a particular make and model of car. Such holders are often also bulky and difficult to travel with, or are designed to permanently attach the desired object.

And in general, these holders provide no scratch or shock protection to the mobile electronic device.

SUMMARY OF THE INVENTION

As such, it is desirable to provide a new holder for a mobile electronic device which is easily portable and can be attached to a wide variety of objects. It is also desirable to provide such a new holder that is designed to protect the mobile device in an impact event, such as a fall or drop.

According to the present invention there is therefore provided a stand for a mobile device as described by way of example below and in the accompanying claims.

In one embodiment of the invention there is provided a holder (1) for a mobile electronic that is configured to hold the mobile electronic device securely to an external object, the holder having two first openings, a first communication path, two second openings, and a second communication path. The two first openings are paired together as a first set of paired openings (16,17). The first communication path connects the first openings (16,17) so that a securing device (300) can be fed into one of the first openings (16,17) and subsequently fed out of the other of the first openings (16,17). The two second openings are paired together as a second set of paired openings (16,17). The second communication path connects the second openings (16,17) so that the securing device (300) can be fed into one of the second openings (16,17) and subsequently fed out of the other of the second openings (16,17). The two first openings are spaced apart from the two second openings so that the securing device (300), which securing device (300) includes one or more separate items, can be secured to the holder (1) at the first set of paired openings (16,17) and at the second set of paired openings (16,17), and additionally wrapped around the external object to secure the holder to the external object.

In another embodiment, the holder (1) includes a case portion (2) that has a pocket, recess, or cavity (15) sized and configured to hold the mobile electronic device, a length dimension in a length direction, a width dimension in a width direction, and a thickness dimension in a thickness direction. Each of the length direction, the width direction, and the thickness direction is orthogonal to the other two of the length direction, the width direction, and the thickness direction. The thickness dimension is smaller than the width dimension, and the width dimension is smaller than the length dimension.

In yet another embodiment, the case portion (2) further has a lip or rim (19) that secures the mobile electronic device in the pocket, recess, or cavity (15).

In a further embodiment, the lip or rim (19) is a deformable lip or rim that deforms to allow the mobile electronic device to be place in the pocket, recess, or cavity (15).

In yet a further embodiment, the case portion (2) is formed from at least one material selected from the group consisting of an elastomeric material, a foam material, a rubber material, silicone, thermoplastic elastomers ("TPEs"), thermoplastic polyurethane ("TPU"), polyolefins, a soft plastic, or any combination thereof.

In another embodiment, the holder (1) further includes a clamp portion (3) that has a first clamp piece (4) and a second clamp piece (5). Each of the first and second clamp pieces (4,5) is configured to engage a respective side (7,8, 13,14) of the case portion (2) so that each of the first and second clamp pieces (4,5) is securely and removably attached to the respective side (7,8,13,14) of the case portion (2).

In yet another embodiment, each of the first and second clamp pieces (4,5) has an indentation or recess (18) configured to accept the respective side (7,8,13,14) of the case portion (2).

In a further embodiment, the indentation or recess (18) of each of the first and second clamp pieces (4,5) accepts the respective side (7,8,13,14) by snapping onto, clicking onto, or clamping onto the respective side (7,8,13,14) to securely attach the clamp portion (3) to the case portion (2).

In yet a further embodiment, the clamp portion (3) is formed from at least one material selected from the group consisting of an elastomeric material, a foam material, a rubber material, silicone, thermoplastic elastomers ("TPEs"), thermoplastic polyurethane ("TPU"), polyolefins, a soft plastic, or any combination thereof.

In another embodiment, the first and second sets of paired openings (16,17) are formed in the case portion (2).

In yet another embodiment, the first set of paired openings (16,17) is formed in the first clamp piece (4) and the second set of paired openings (16,17) is formed in the second clamp piece (5).

In a further embodiment, the first set of paired openings (16,17) is formed in the case portion (2). The second set of paired openings (16,17) is formed in the first clamp piece (4) or the second clamp piece (5).

In yet a further embodiment, the holder (1) further includes two third openings, a third communication path, two fourth openings, and a fourth communication path. The two third openings are paired together as a third set of paired openings (16,17). The third communication path connects the third openings (16,17) so that the securing device (300) can be fed into one of the third openings (16,17) and subsequently fed out of the other of the third openings (16,17). The two fourth openings are paired together as a fourth set of paired openings (16,17). The fourth communication path connects the fourth openings (16,17) so that the securing device (300) can be fed into one of the fourth openings (16,17) and subsequently fed out of the other of the fourth openings (16,17). The two third openings are spaced apart from the two fourth openings so that the securing device (300) can be secured to the holder (1) at the third set of paired openings (16,17) and at the fourth set of paired openings (16,17), and additionally wrapped around the external object to secure the holder to the external object.

In another embodiment, the third and fourth sets of paired openings (16,17) are formed in the case portion (2).

In yet another embodiment, the holder (1) further includes two third openings, a third communication path, two fourth openings, a fourth communication path, two fifth openings, a fifth communication path, two sixth openings, and a sixth communication path. The two third openings are paired together as a third set of paired openings (16,17). The third communication path connects the third openings (16,17) so that the securing device (300) can be fed into one of the third openings (16,17) and subsequently fed out of the other of the third openings (16,17). The two fourth openings that paired together as a fourth set of paired openings (16,17). The fourth communication path connects the fourth openings (16,17) so that the securing device (300) can be fed into one of the fourth openings (16,17) and subsequently fed out of the other of the fourth openings (16,17). The two fifth openings are paired together as a fifth set of paired openings (16,17). The fifth communication path connects the fifth openings (16,17) so that the securing device (300) can be fed into one of the fifth openings (16,17) and subsequently fed out of the other of the fifth openings (16,17). The two sixth openings are paired together as a sixth set of paired openings (16,17). The sixth communication path connects the sixth openings (16,17) so that the securing device (300) can be fed into one of the sixth openings (16,17) and subsequently fed out of the other of the sixth openings (16,17). The two third openings are spaced apart from the two fourth openings so that the securing device (300) can be secured to the holder (1) at the third set of paired openings (16,17) and at the fourth set of paired openings (16,17), and additionally wrapped around the external object to secure the holder to the external object. The two fifth openings are spaced apart from the two sixth openings so that the securing device (300) can be secured to the holder (1) at the fifth set of paired openings (16,17) and at the sixth set of paired openings (16,17), and additionally wrapped around the external object to secure the holder to the external object. The third, fourth, fifth, and sixth sets of paired openings (16,17) are formed in the case portion (2).

In a further embodiment, the holder (1) includes a clamp portion (3) that has a first clamp piece (4) and a second clamp piece (5). Each of the first and second clamp pieces (4,5) is configured to engage a respective side of the mobile electronic device so that each of the first and second clamp pieces (4,5) is securely and removably attached to the respective side of the mobile electronic device. The first set of paired openings (16,17) is formed in the first clamp piece (4) and the second set of paired openings (16,17) is formed in the second clamp piece (5).

In yet a further embodiment, the first set of paired openings (16,17) is formed at a first length end of the case portion (2) in the length direction. The second set of paired openings (16,17) is formed at a second length end of the case portion (2) in the length direction opposite to the first length end.

In another embodiment, the first set of paired openings (16,17) is formed at a first width end of the case portion (2) in the width direction. The second set of paired openings (16,17) is formed at a second width end of the case portion (2) in the length direction opposite to the first width end.

In yet another embodiment, the holder (1) further includes two third openings, a third communication path, two fourth openings, and a fourth communication path. The two third openings are paired together as a third set of paired openings (16,17). The third communication path connects the third openings (16,17) so that the securing device (300) can be fed into one of the third openings (16,17) and subsequently fed out of the other of the third openings (16,17). The two fourth openings are paired together as a fourth set of paired openings (16,17). The fourth communication path connects the fourth openings (16,17) so that the securing device (300) can be fed into one of the fourth openings (16,17) and subsequently fed out of the other of the fourth openings (16,17). The two third openings are spaced apart from the two fourth openings so that the securing device (300) can be secured to the holder (1) at the third set of paired openings (16,17) and at the fourth set of paired openings (16,17), and additionally wrapped around the external object to secure the holder to the external object. The third set of paired openings (16,17) is formed at a first width end of the case portion (2) in the width direction. The fourth set of paired openings (16,17) is formed at a second width end of the case portion (2) in the length direction opposite to the first width end.

In a further embodiment, each opening of each set of paired openings (16,17) is configured to accept at least one item selected from the group consisting of a string, wire, cord, elastic cord, bungee cord, rope, cable, strap as at least part of the securing device (300).

In yet a further embodiment, the holder (1) does not include any metal or magnetic materials.

In another embodiment of the invention, the first and second clamp pieces (4,5) together act as a securing device. Each of the first and second clamp pieces (4,5) includes a clamping portion (4b,5b) configured to engage the respective side (7,8,13,14) of the case portion (2) so that the clamping portion (4b,5b) is securely and removably attached to the respective side (7,8,13,14) of the case portion (2); a flexible extension (4a,5a) that extend from the clamping portion (4b,5b); and a connecting portion (4c,5c) located at an end of the flexible extension (4a,5a) opposite to the clamping portion (4b,5b), the connecting portion (4c,5c) being configured to securely engage with and connect to the case portion (2).

In yet another embodiment of the invention, each connecting portion (4c,5c) securely engages with and connects to the case portion (2) via a corresponding one of the first and sets of paired openings (16,17).

In a further embodiment of the invention, each connecting portion (4c,5c) securely engages with and connects to the case portion (2) via a corresponding one of the first and sets of paired openings (16,17) so that for each connecting portion (4c,5c): a first portion of the flexible extension (4a,5a) or of the connecting portion (4c,5c) is arranged in the corresponding one of the first and sets of paired openings (16,17); a second portion of the flexible extension (4a,5a), connected to the first portion of the flexible extension (4a,5a) or of the connecting portion (4c,5c), is arranged outside the case portion (2) on one side of the corresponding one of the first and sets of paired openings (16,17); and a second portion of the connecting portion (4c,5c), connected to the first portion of the flexible extension (4a,5a) or of the connecting portion (4c,5c), is arranged outside the case portion (2) on another side of the corresponding one of the first and sets of paired openings (16,17) different from the one side. The first portion of the flexible extension (4a,5a) or of the connecting portion (4c,5c) itself is located in between the second portion of the flexible extension (4a,5a) and the second portion of the connecting portion (4c,5c).

In yet a further embodiment of the invention, each flexible extension (4a,5a) is formed in an undulating pattern with alternating peaks (4d,5d) and troughs (4e,5e).

In another embodiment of the invention, the undulating pattern is in the shape of a wave, zig-zag, or sinusoidal pattern.

In yet another embodiment of the invention, for each connecting portion (4c,5c), the peaks (4d,5d) and troughs (4e,5e) alternate in an extension direction from the clamping portion (4b,5b) to the connecting portion (4c,5c).

In a further embodiment of the invention, for each connecting portion (4c,5c), each peak (4d,5d) has a corresponding trough (4e,5e) on an opposite side of the flexible extension (4a,5a) in a direction substantially perpendicular to the extension direction In yet a further embodiment of the invention, for each connecting portion (4c,5c), the flexible extensions (4a,5a), the clamping portion (4b,5b), and the connecting portion (4c,5c) are integral with each other so that the clamp piece (4,5) is formed as an integral singular continuous clamp piece (4,5).

In another embodiment of the invention, each clamp piece 4,5 is formed from a single uniform material.

In another embodiment of the invention there is provided a holder (1) for a mobile electronic that is configured to hold the mobile electronic device securely to an external object. The holder has a clamp portion (3) that includes a first clamp piece (4) and a second clamp piece (5). Each of the first and second clamp pieces (4,5) has: a clamping portion (4b,5b) configured to engage a respective side (7,8,13,14) of the mobile electronic device or of a case portion (2) configured to hold the mobile electronic device so that the clamping portion (4b,5b) is securely and removably attached to the respective side (7,8,13,14) of the case portion (2) or of the mobile electronic device; a flexible extension (4a,5a) that extend from the clamping portion (4b,5b); and a connecting portion (4c,5c) located at an end of the flexible extension (4a,5a) opposite to the clamping portion (4b,5b), the connecting portion (4c,5c) being configured to securely engage with and connect to the case portion (2), the external object, the connection portion (4c,5c) of the other of the first and second clamp pieces (4,5), or a combination thereof.

It is noted that the features of the above-described embodiments are not exclusive to each other, and that any one of the above embodiments/features can be combined with one or more of the other embodiments/features to arrive at further embodiments.

The inventive stand can be designed to fit a variety of mobile devices—such as smartphones and other portable electronic devices—as well as cases therefor.

BRIEF DESCRIPTION OF THE DRAWINGS

FIG. 2 is a front view of the holder for a mobile electronic device in accordance with an embodiment of the invention.

FIG. 3 is a left side view of the holder for a mobile electronic device in accordance with an embodiment of the invention.

FIG. 4 is a right side view of the holder for a mobile electronic device in accordance with an embodiment of the invention.

FIG. 5 is a lower side view of the holder for a mobile electronic device in accordance with an embodiment of the invention.

FIG. 6 is a rear view of the holder for a mobile electronic device in accordance with an embodiment of the invention.

FIG. 9 is a front view of the holder for a mobile electronic device in accordance with an embodiment of the invention.

FIG. 15 is a upper side view of the holder for a mobile electronic device in accordance with an embodiment of the invention.

FIG. 16 is a front view of the holder for a mobile electronic device in accordance with an embodiment of the invention.

FIG. 19 is a lower side view of the holder for a mobile electronic device in accordance with an embodiment of the invention.

FIG. 20 is a rear view of the holder for a mobile electronic device in accordance with an embodiment of the invention.

FIG. 21 is an exploded front upper-side perspective view of the holder for a mobile electronic device in accordance with an embodiment of the invention.

FIG. 22 is a front view of the holder for a mobile electronic device in accordance with an embodiment of the invention with the holder being in a landscape orientation, position, or state.

FIG. 29 is a front view of the holder for a mobile electronic device in accordance with an embodiment of the invention.

FIG. 30 is a left side view of the holder for a mobile electronic device in accordance with an embodiment of the invention.

FIG. 31 is a right side view of the holder for a mobile electronic device in accordance with an embodiment of the invention.

FIG. 32 is a lower side view of the holder for a mobile electronic device in accordance with an embodiment of the invention.

FIG. 33 is a rear view of the holder for a mobile electronic device in accordance with an embodiment of the invention.

FIG. 36 is a front view of the holder for a mobile electronic device in accordance with an embodiment of the invention.

FIG. 39 is a lower side view of the holder for a mobile electronic device in accordance with an embodiment of the invention.

FIG. 40 is a rear view of the holder for a mobile electronic device in accordance with an embodiment of the invention.

FIG. 49 is a upper side view of the left clamp piece for a mobile electronic device in accordance with an embodiment of the invention.

FIG. 50 is a front view of the left clamp piece for a mobile electronic device in accordance with an embodiment of the invention.

DETAILED DESCRIPTION OF EMBODIMENTS

Figure 1:
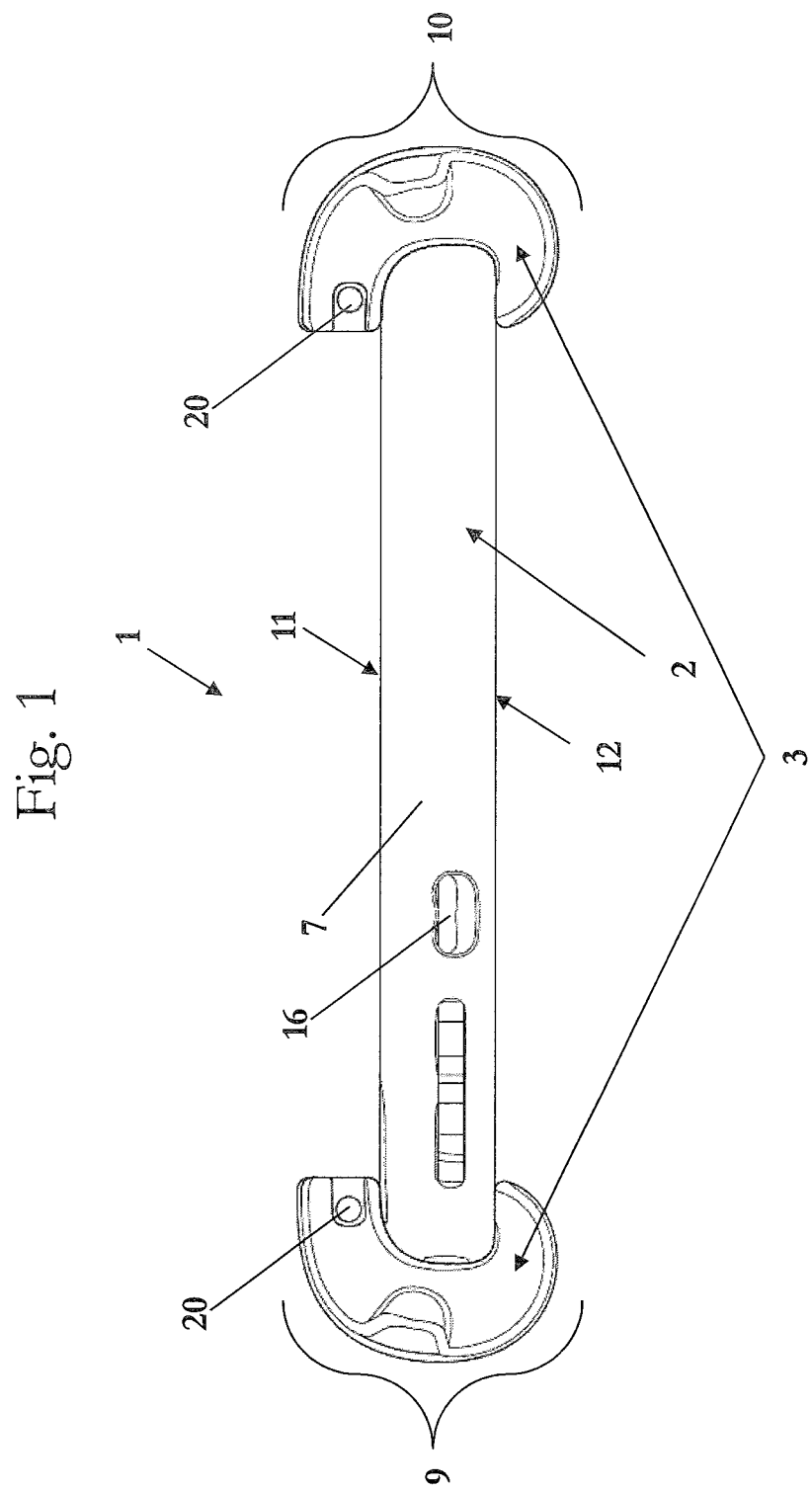
FIG. 1 is a upper side view of the holder for a mobile electronic device in accordance with an embodiment of the invention.
Figure 7:
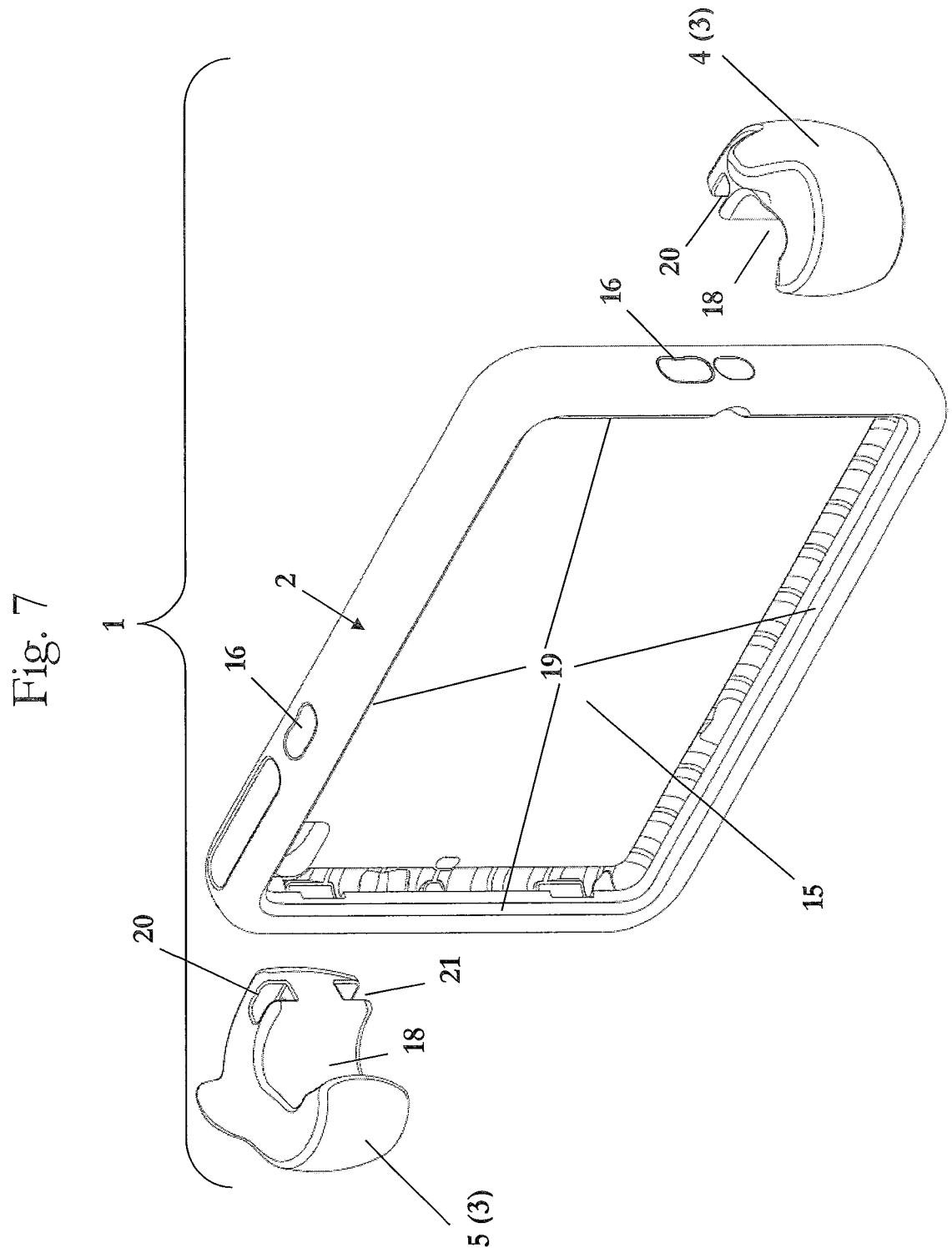
FIG. 7 is an exploded front upper-side perspective view of the holder for a mobile electronic device in accordance with an embodiment of the invention.
Figure 8:
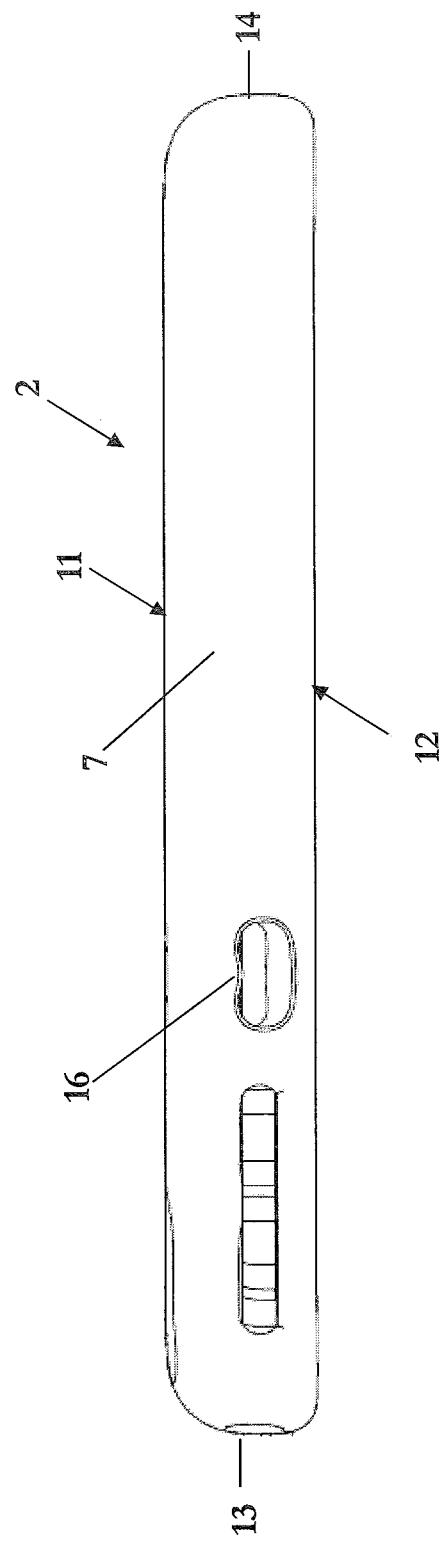
FIG. 8 is a upper side view of the holder for a mobile electronic device in accordance with an embodiment of the invention.
Figure 11:
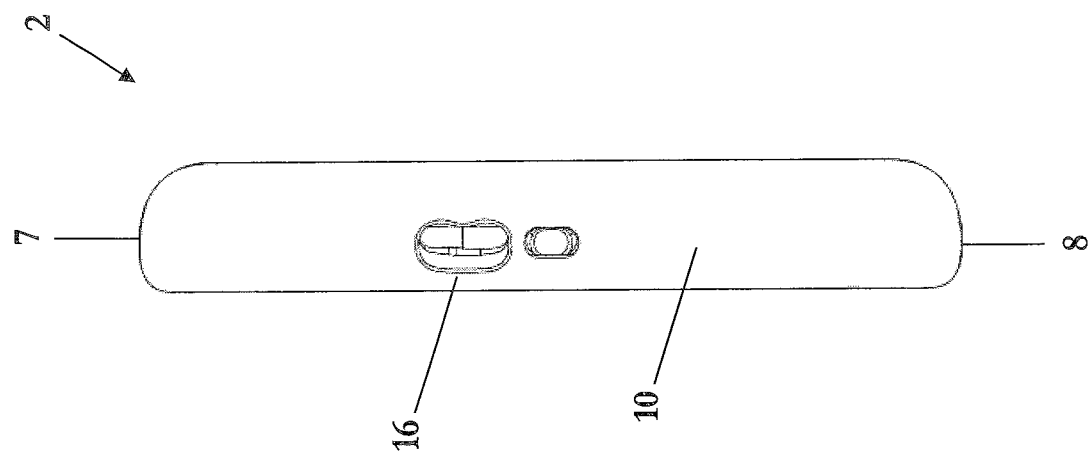
FIG. 11 is a right side view of the holder for a mobile electronic device in accordance with an embodiment of the invention.
Figure 10:
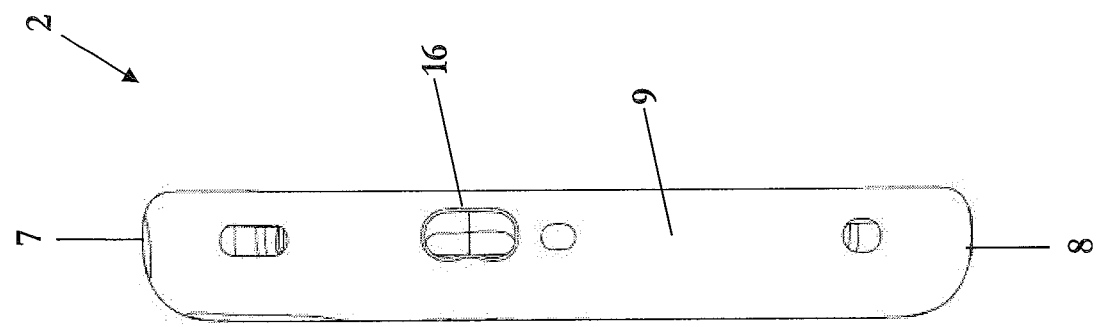
FIG. 10 is a left side view of the holder for a mobile electronic device in accordance with an embodiment of the invention.
Figure 12:
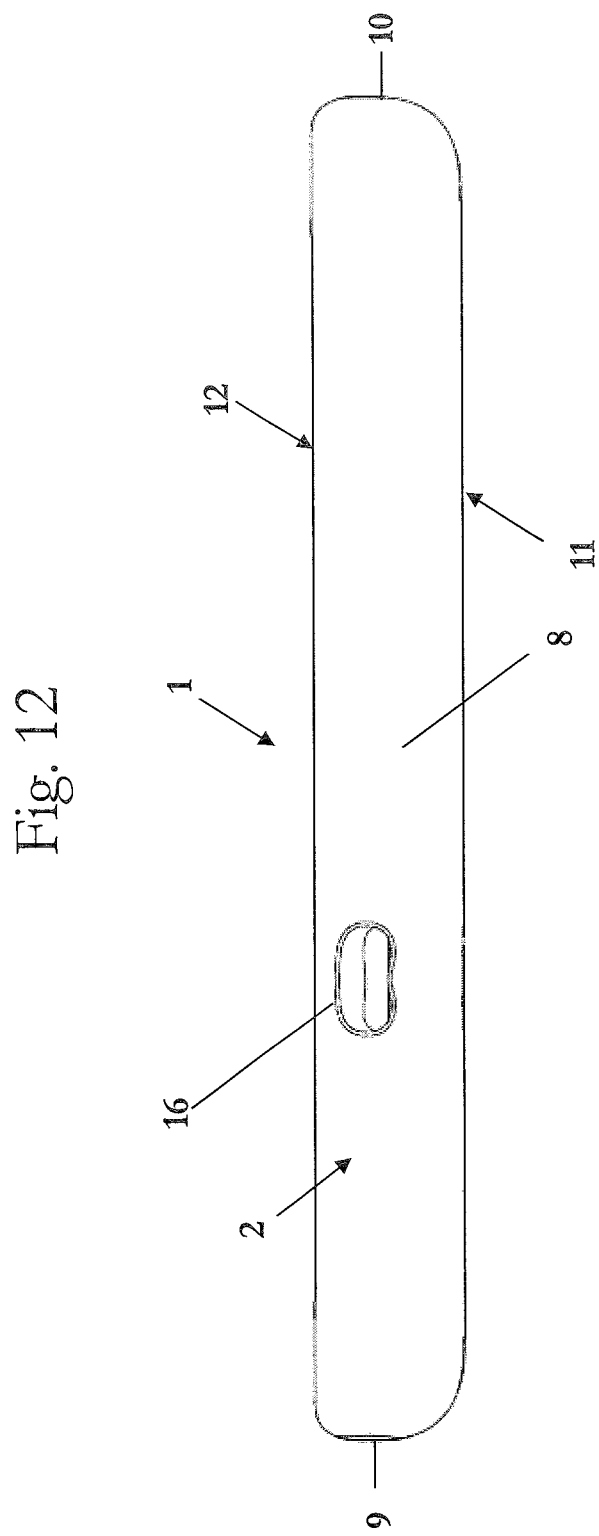
FIG. 12 is a lower side view of the holder for a mobile electronic device in accordance with an embodiment of the invention.
Figure 13:
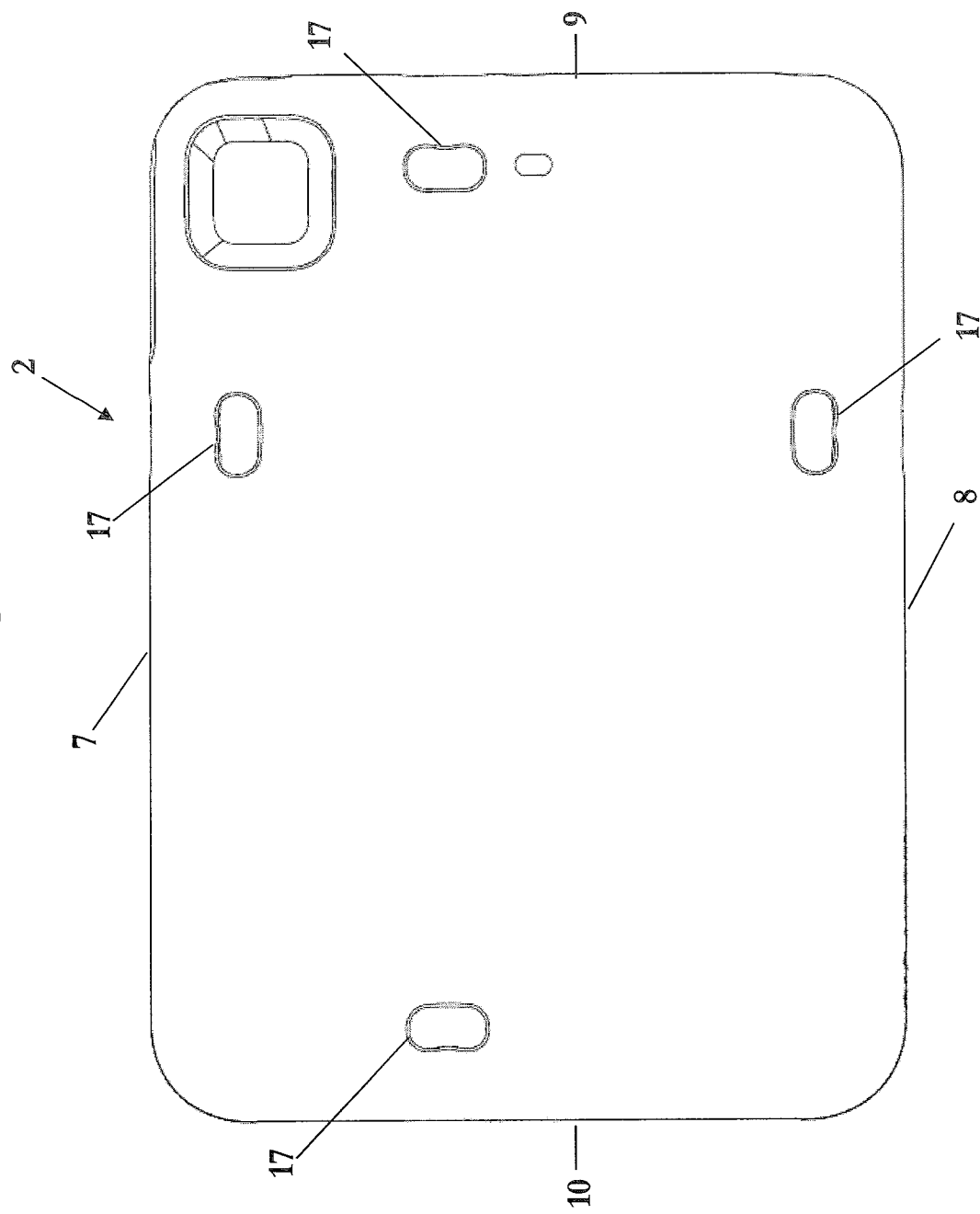
FIG. 13 is a rear view of the holder for a mobile electronic device in accordance with an embodiment of the invention.
Figure 14:
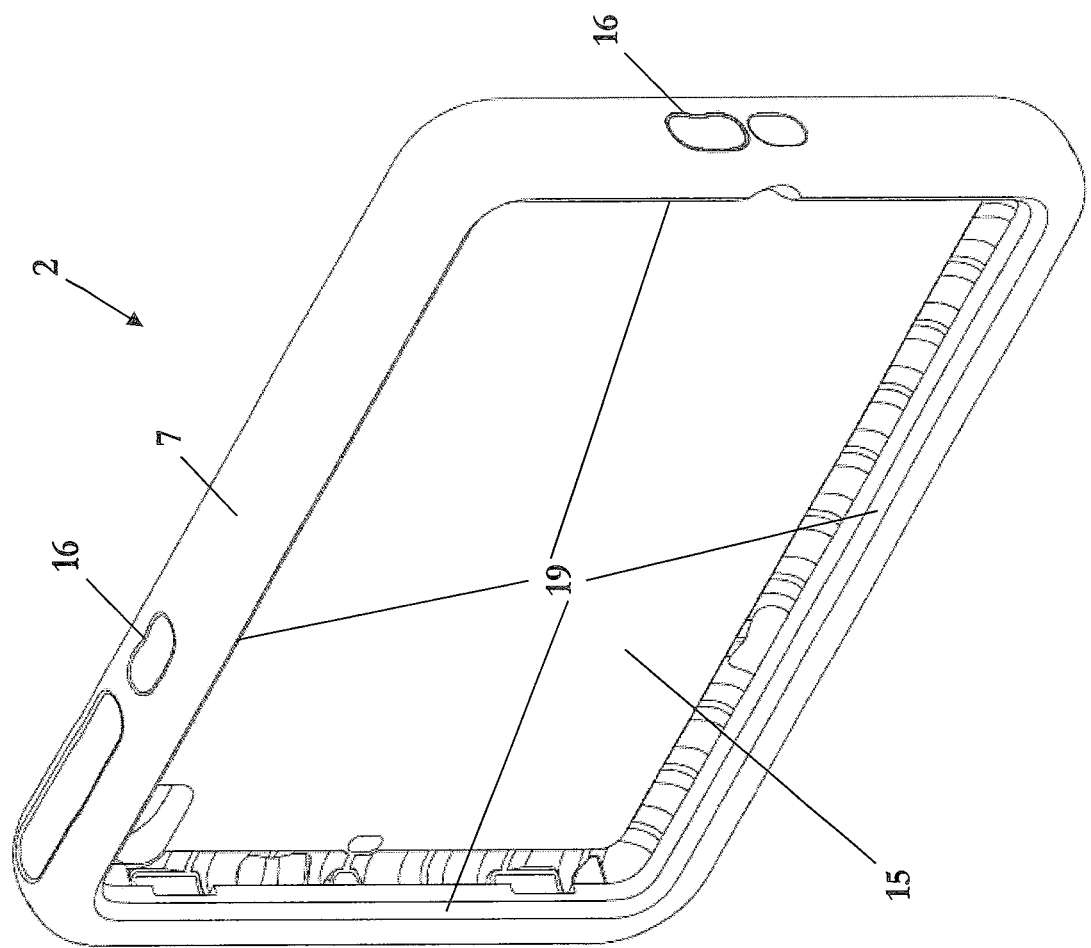
FIG. 14 is a front upper-side perspective view of the holder for a mobile electronic device in accordance with an embodiment of the invention.
Figure 18:
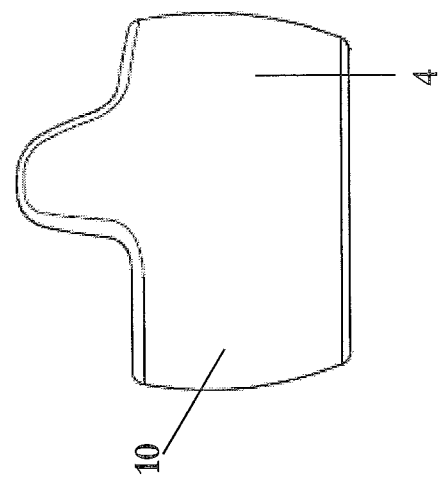
FIG. 18 is a right side view of the holder for a mobile electronic device in accordance with an embodiment of the invention.
Figure 17:
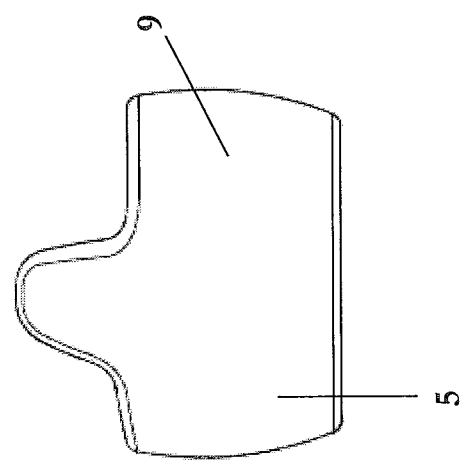
FIG. 17 is a left side view of the holder for a mobile electronic device in accordance with an embodiment of the invention.

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments. It is noted that any numerical ranges disclosed herein are included to individually disclose every sub-range and number, both whole integer and partial fraction, within the disclosed range. For example, a disclosed range of 1-100 is intended to individually disclose 20-90, 40-80, 30.5-50.2, 20, 67.3, 84.512924, and every other range and number that falls within the recited range.

FIGS. 1-7 show the holder 1 in accordance with an embodiment of the invention. The holder 1 has an upper side 7, a lower side 8, a left side 9, and a right side 10. A rear side 11 of the holder 1 is configured to cover at least part of a rear side of a mobile device when attached to the holder 1, and a front side 12 is configured to expose at least part of a front side of a mobile device when attached to the holder 1.

In one embodiment, the holder 1 includes a case portion 2 and a clamp portion 3. The case portion 2 includes a pocket, recess, or cavity 15 sized and configured to hold a mobile electronic device. The case portion 2 also includes a lip or rim 19 that secures the mobile electronic device in the pocket, recess, or cavity 15. Preferably the lip or rim 19 is a deformable lip or rim that deforms to allow the mobile electronic device to be place in the pocket, recess, or cavity 15.

The clamp portion 3 includes a right clamp piece 4 and a left clamp piece 5. The right clamp piece 4 is configured to clamp onto, snap onto, click onto, or otherwise engage a right side 14 of the case portion 2 or a right side of a mobile device so that the right clamp piece 4 is secured to the right side 14 of the case portion 2 or the right side of a mobile device. This can be accomplished, for example, by an indentation, recess, or the like 18 formed in or by the right clamp piece 4, into which the right side 14 of the case portion 2 or the right side of a mobile device fits, snaps, clicks, or otherwise is secured.

Similarly, the left clamp piece 5 is configured to clamp onto, snap onto, click onto, or otherwise engage a left side 13 of the case portion 2 or a left side of a mobile device so that the left clamp piece 5 is secured to the left side 13 of the case portion 2 or the right side of a mobile device. This can be accomplished, for example, by an indentation, recess, or the like 18 formed in or by the left clamp piece 5, into which the left side 13 of the case portion 2 or the left side of a mobile device fits, snaps, clicks, or otherwise is secured.

The case portion 2, clamp portion 3, or both include at least one set of paired openings 16,17. Each opening 16 communicates with a corresponding opening 17 so that a securing device 300—such as a string, wire, cord, elastic cord, bungee cord, rope, cable, strap, or the like—can be fed into one of the openings 16 and subsequently fed out of the corresponding opening 17, or can be fed into one of the openings 17 and subsequently fed out of the corresponding opening 16—for example, as shown in FIGS. 22-27. This allows the securing device 300 to be fed through and secured by one set of paired openings 16,17, wrapped around an object—such as a car headrest 200—and fed through and secured by another set of paired openings 16,17, thereby securing the holder 1 to the object (e.g., headrest 200).

While FIGS. 1-7 and 22-27 show the holder 1 including three separate and distinct pieces 2,4,5, this need not be the case. For example, the holder 1 could be formed by just one piece—such as the case portion 2. The securing device 300 could then be wrapped around the object (e.g., headrest 200) and fed through and secured by two sets of paired openings 16,17 to secure the case portion 2 to the object. If needed, a second securing device 300 could also be wrapped around the object and fed through and secured by another two sets of paired openings 16,17 to further secure the case portion 2 to the object.

As another example, the holder 1 could be formed by two pieces, such as the right and left clamp pieces 4,5 of the clamp portion 3. The securing device 300 could then be wrapped around the object (e.g., headrest 200) and fed through and secured by the set of paired openings 20,21 of the right clamp piece 4 and the set of paired openings 20,21 of the left claim piece 5 to secure the case portion 2 to the object.

The sets of paired openings 16,17 of the case portion 2 are preferably formed so that a first two sets of paired openings 16,17 are opposite each other in a first direction, and a second two sets of paired openings 16,17 are opposite each other in a second direction orthogonal to the first direction. This allows the holder 1, either as the case portion 2 alone or as the combined case portion 2 and clamp portion 3, to be secured to and object (i.e., headrest 200) in multiple directions or orientations.

For example, a first set of paired openings 16,17 can be arranged on an upper portion of the case portion 2 (e.g., upper side 7 and rear side 11) and a second set of paired openings can be arranged on an lower portion of the case portion 2 (e.g., lower side 8 and rear side 11). This allows the holder 1 to be arranged in a landscape direction/orientation as shown in FIGS. 22, 23, 26, and 27.

As another example, a third set of paired openings 16,17 can be arranged on an left portion of the case portion 2 (e.g., left side 13 and rear side 11) and a fourth set of paired openings can be arranged on a right portion of the case portion 2 (e.g., right side 14 and rear side 11). This allows the holder 1 to be arranged in a portrait direction/orientation as shown in FIGS. 24 and 25.

Using two separate and distinct clamp pieces 4,5 for the clamp portion 3 also allows the holder 1, either as the clamp portion 3 alone or as the combined case portion 2 and clamp portion 3, to be secured to an object (i.e., headrest 200) in multiple directions or orientations. In particular, since the clamp portion 3 is formed by two separate and distinct clamp pieces 4,5, it can be configured to fit a range of different widths or lengths of case portions 2 or mobile electronic devices. This allows the clamp portion 3 to engage with and secure the case portion 2 or mobile electronic device in either a landscape direction/orientation as shown in FIGS. 22, 23, 26, and 27, or in-a portrait direction/orientation as shown in FIGS. 24 and 25.

Figure 23:
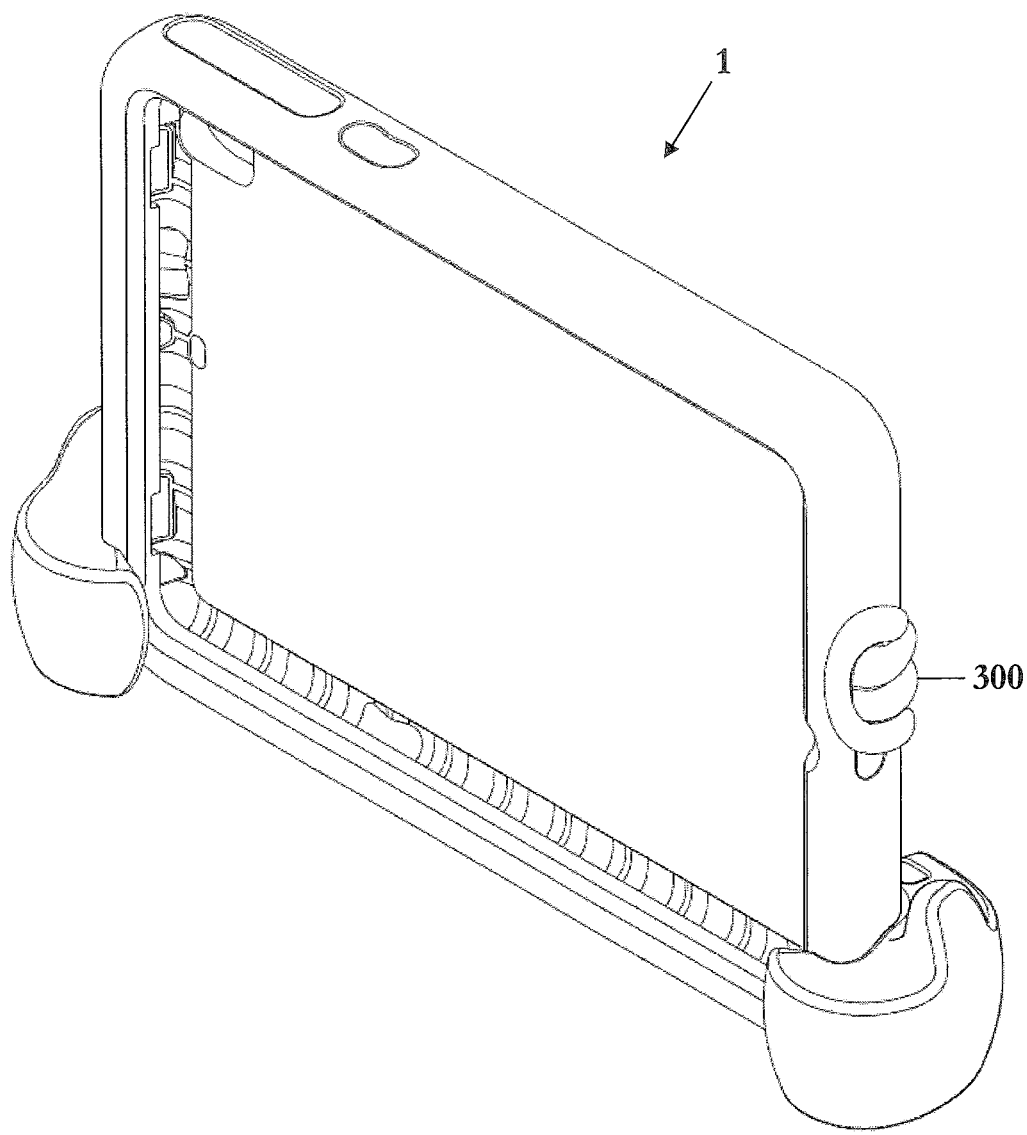
FIG. 23 is a front upper-right-side perspective view of the holder for a mobile electronic device in accordance with an embodiment of the invention with the holder being in the landscape orientation, position, or state.
Figure 24:
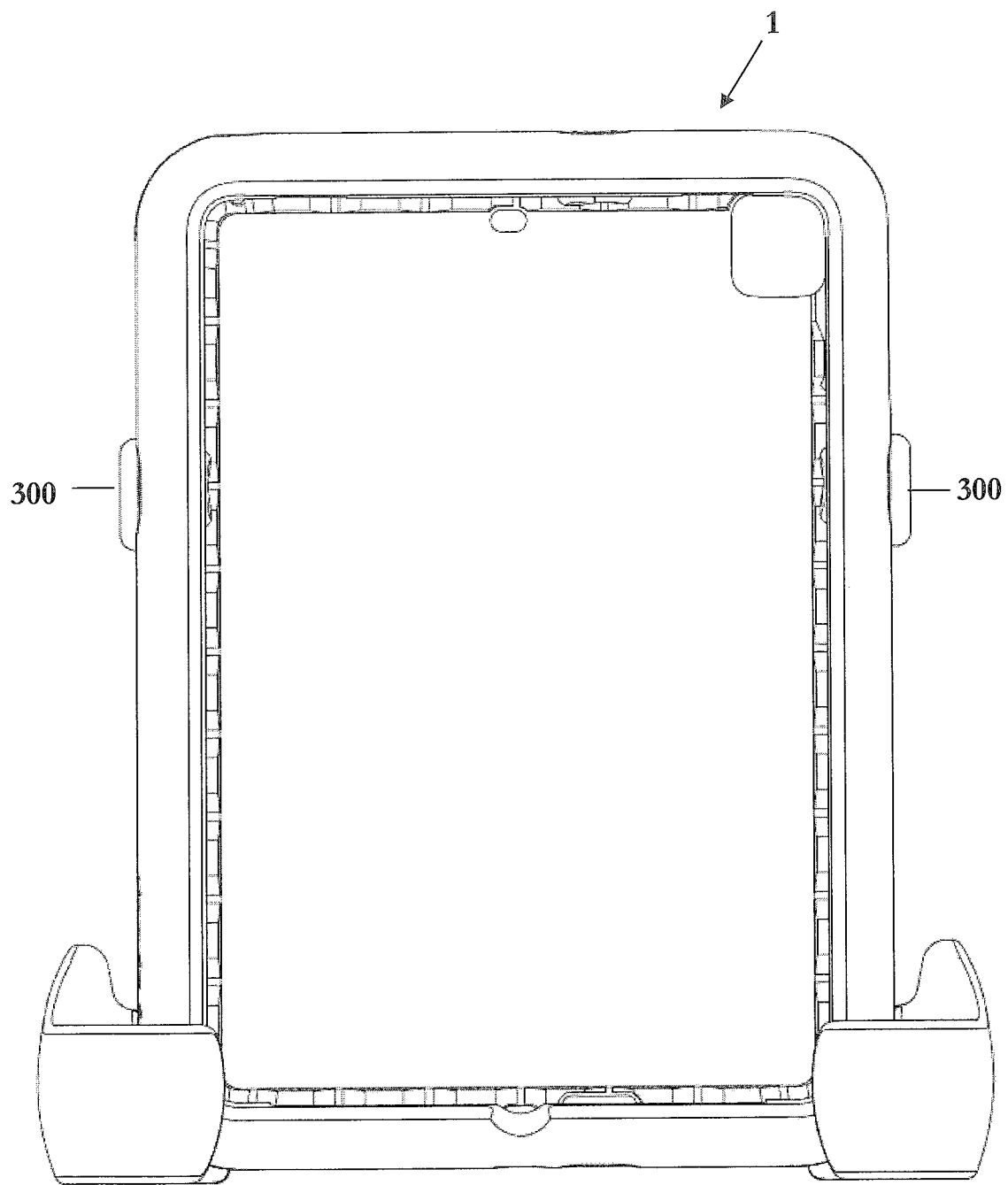
FIG. 24 is a front view of the holder for a mobile electronic device in accordance with an embodiment of the invention with the holder being in a portrait orientation, position, or state.
Figure 25:
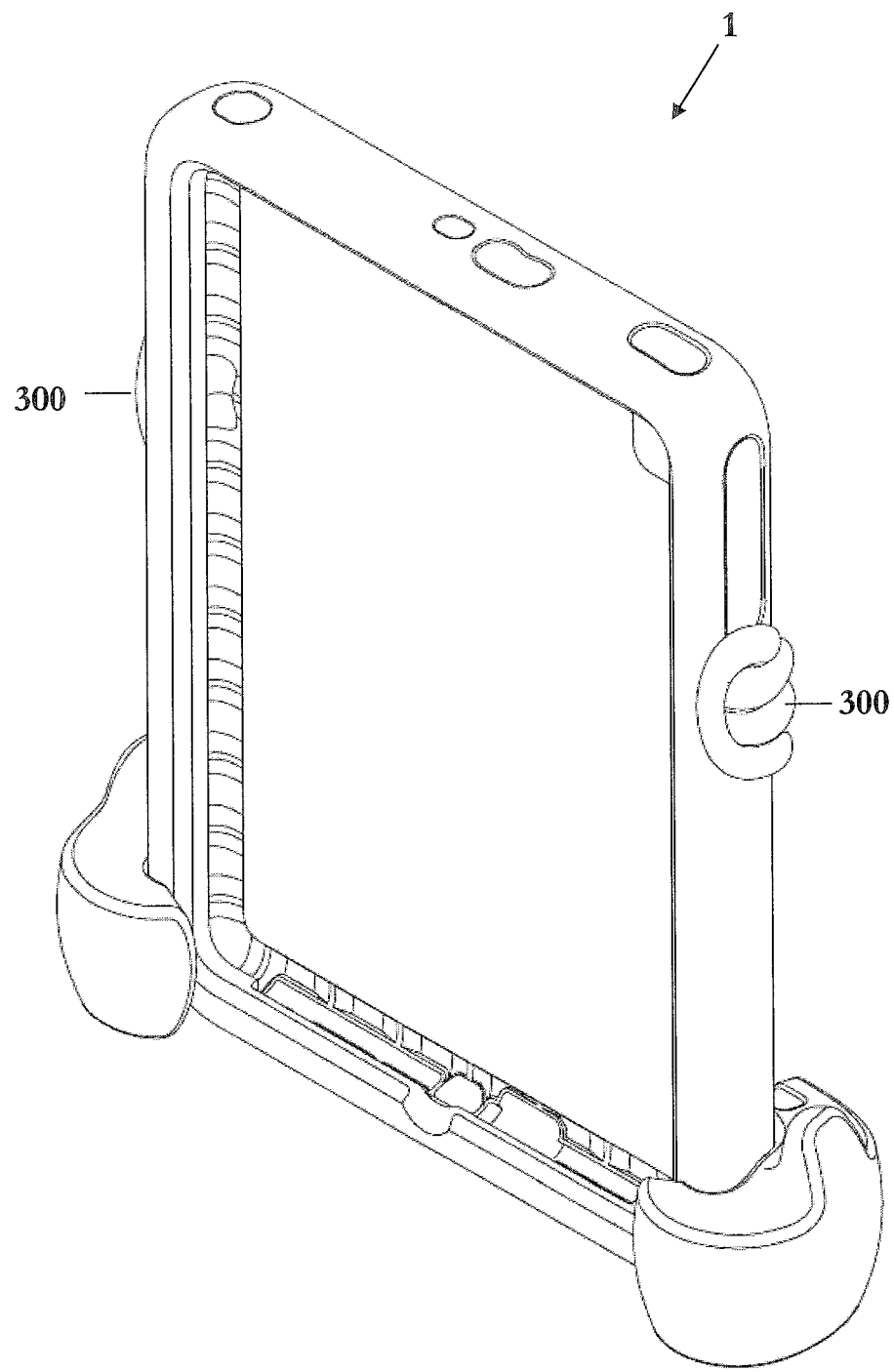
FIG. 25 is a front upper-left-side perspective view of the holder for a mobile electronic device in accordance with an embodiment of the invention with the holder being in the portrait orientation, position, or state.
Figure 26:
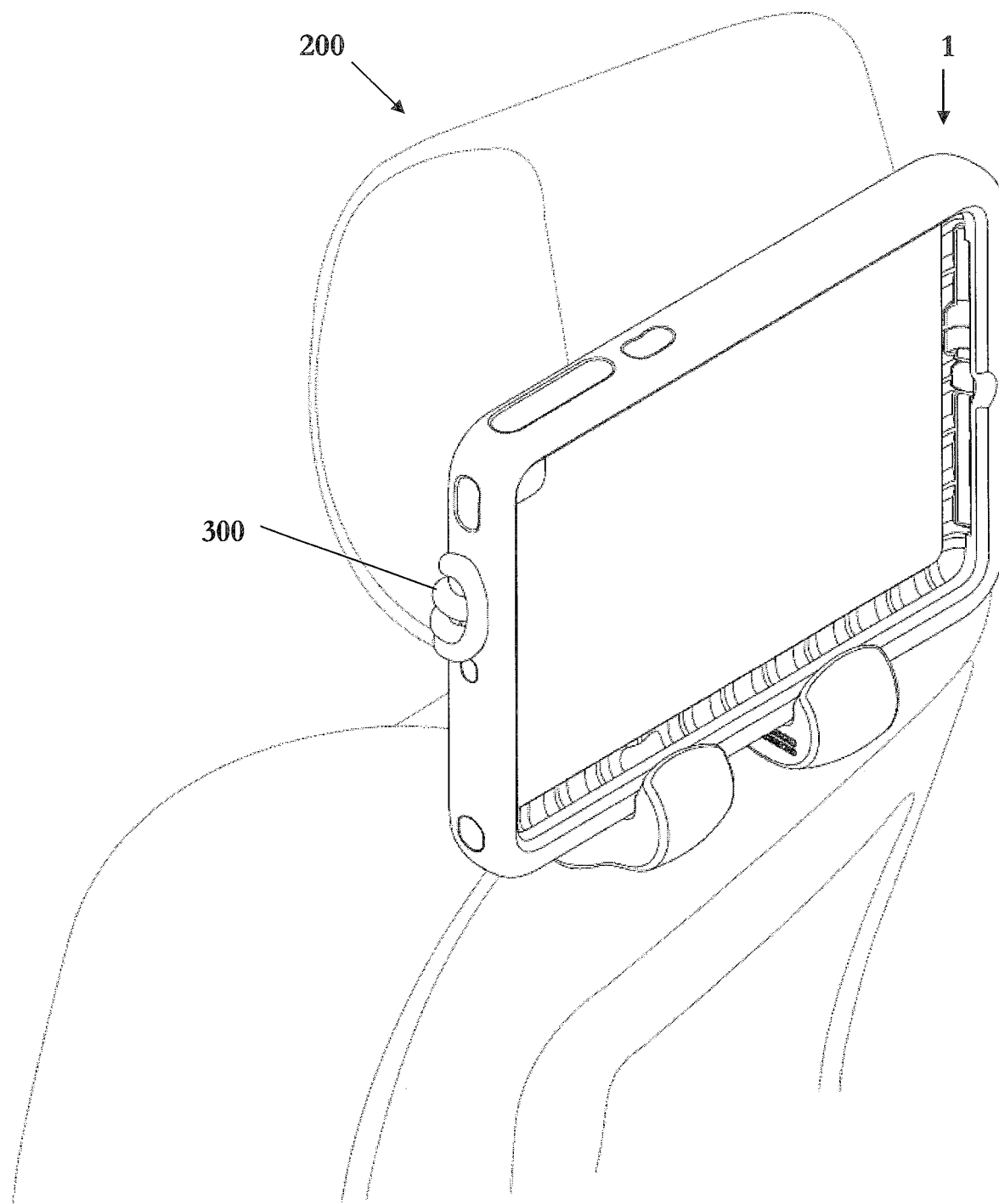
FIGS. 26 and 27 are views of the holder for a mobile electronic device in accordance with an embodiment of the invention with the holder being attached or connected to a headrest of a car.

In addition, positioning the clamp pieces 4,5 at the bottom of the case portion 2 or mobile electronic device when in a landscape direction/orientation as shown in FIGS. 22 and 23, or when in a portrait direction/orientation as shown in FIGS. 24 and 25, enables the clamp pieces 4,5 to function as a stand for the case portion 2 or mobile electronic device to maintain the case portion 2 or mobile electronic device in an upright standing position on a horizontal surface like a desk, table, counter, or the like.

The holder 1 also preferably does not include any metal or magnetic materials. This means that an attached device will have stronger and more reliable wireless signals/connectivity—both wireless data signals (e.g., Bluetooth, WiFi, cellular, 2G, 3G, 4G LTE, etc.) and wireless charging signals (e.g., inductive charging, non-radiative charging, radiative electromagnetic resonant charging, etc.)—than holders with metal components.

Each of the case portion 2, the right clamp piece 4, and the left clamp piece 5 may be injection molded or die-cut, and may be formed from one or more pieces of a soft flexible material, such as an elastomeric material, foams, ethylene-vinyl acetate ("EVA") foam, rubber, silicone, thermoplastic elastomers ("TPEs"), thermoplastic polyurethane ("TPU"), polyolefins, a similar soft plastic or rubber material, or any combination thereof.

Figure 27:
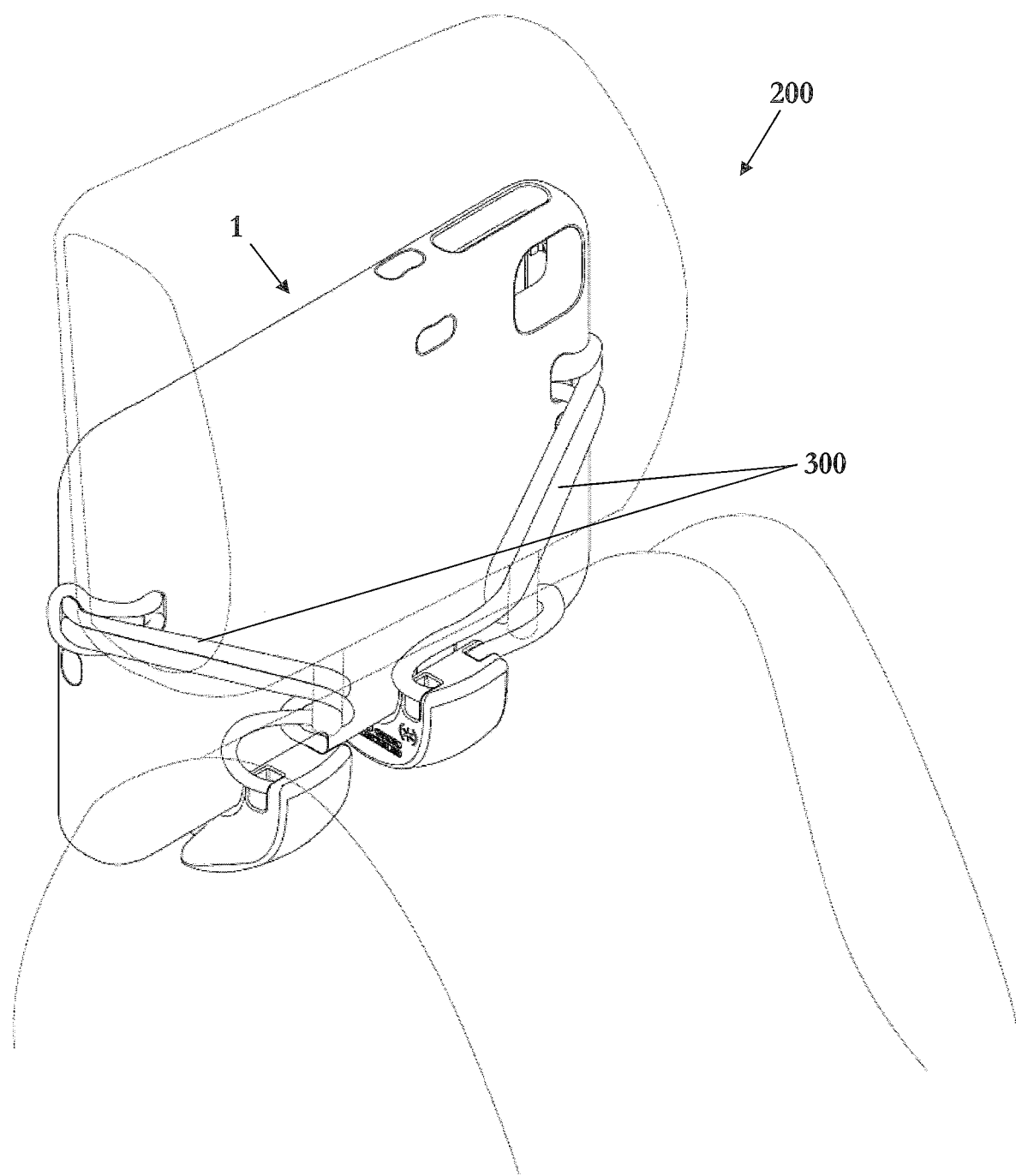

While FIG. 27 shows the securing device 300 as including two separate items—namely two separate cords—the securing device 300 may also be formed from a single string, wire, cord, elastic cord, bungee cord, rope, cable, strap, or the like. Similarly, the securing device 300 may also be formed by more than two separate items selected from string, wire, cord, elastic cord, bungee cord, rope, cable, strap, or the like.

FIGS. 28-59 show additional embodiments of the holder 1. While this embodiment is substantially similar to the embodiment described above, there are a few differences.

Figure 28:
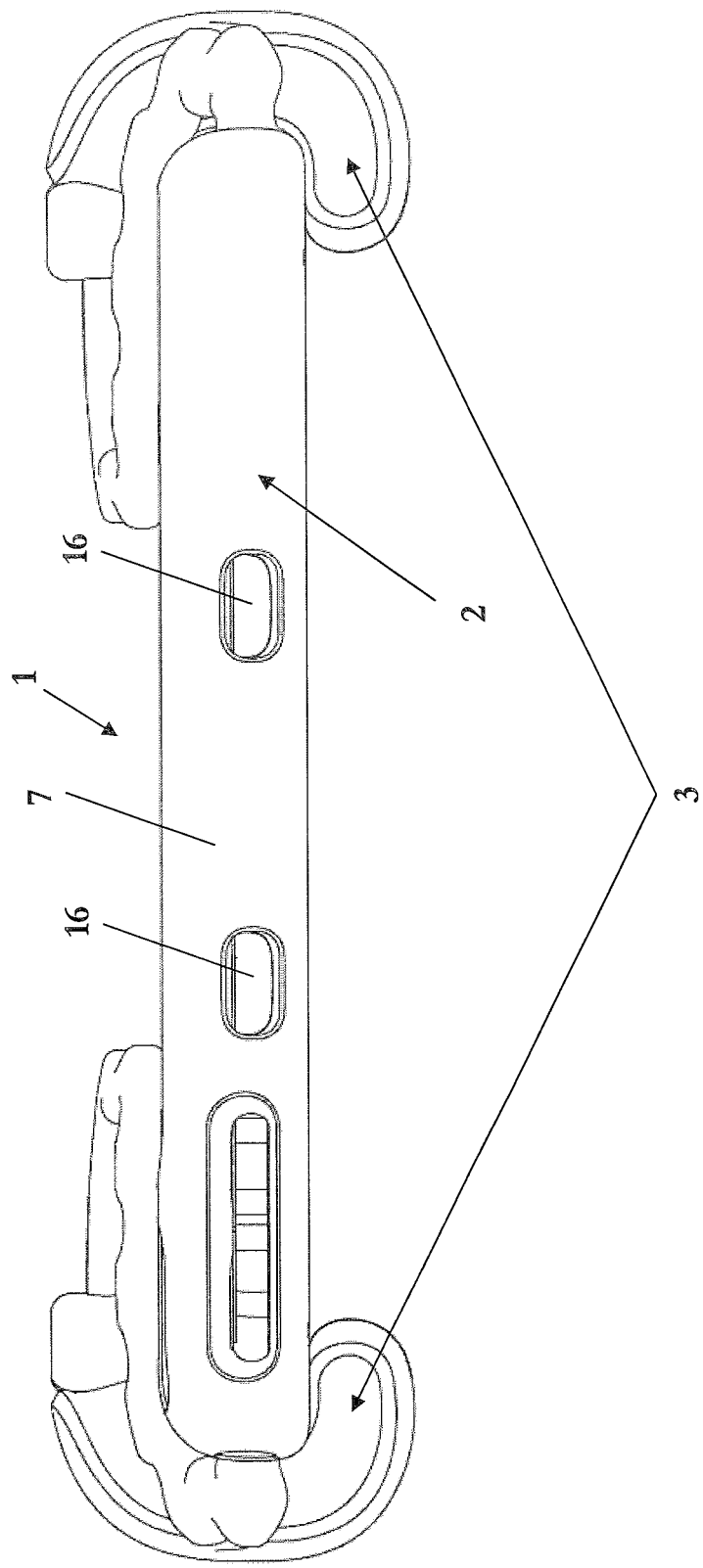
FIG. 28 is a upper side view of the holder for a mobile electronic device in accordance with an embodiment of the invention.
Figure 34:
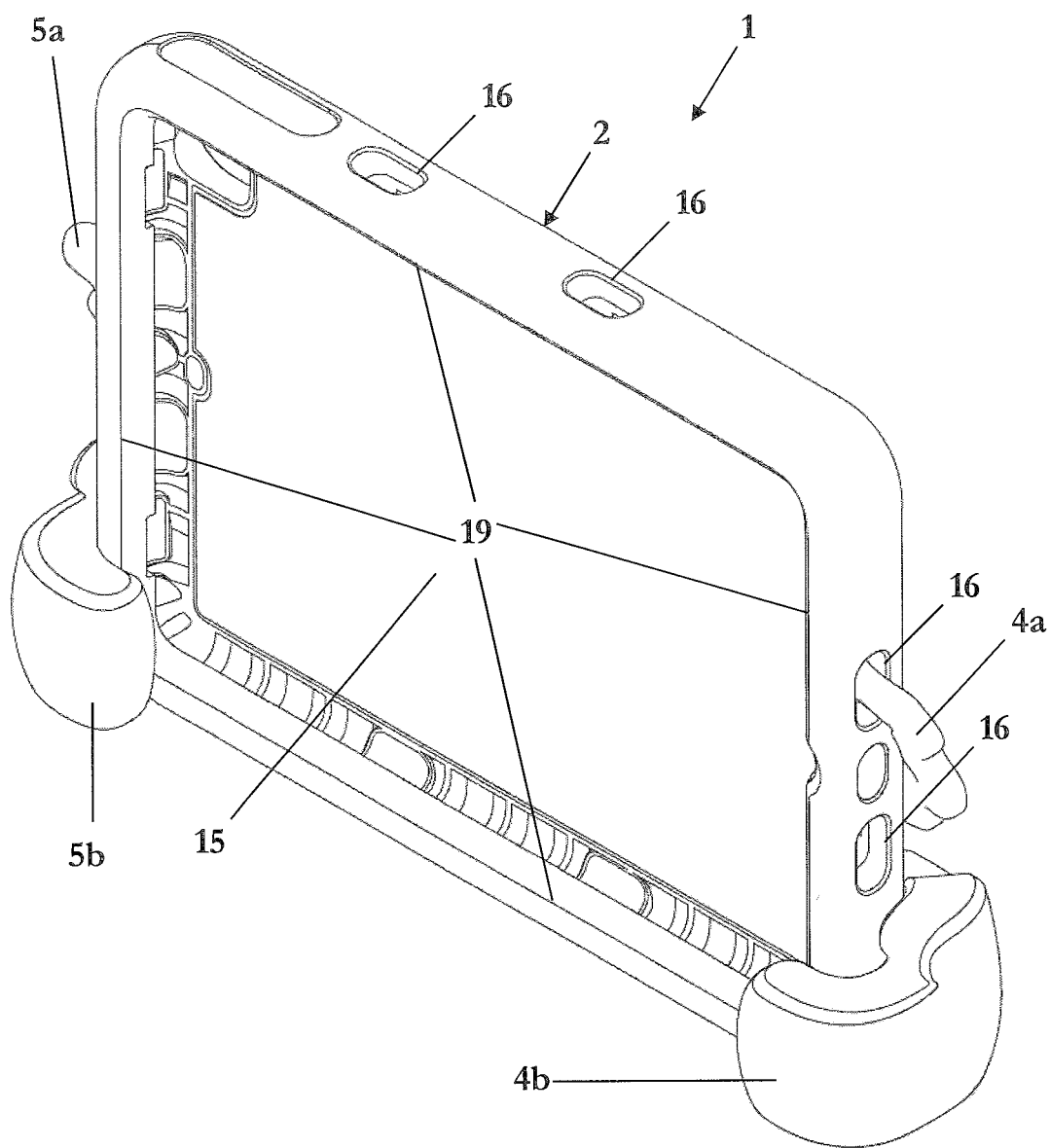
FIG. 34 is a front upper-side perspective view of the holder for a mobile electronic device in accordance with an embodiment of the invention.
Figure 35:
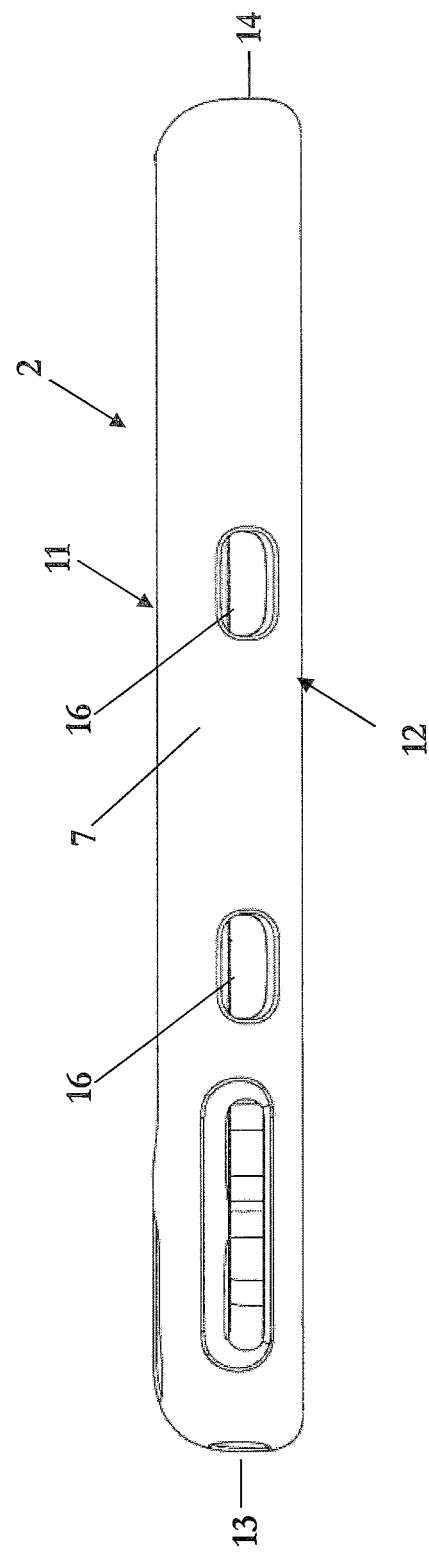
FIG. 35 is a upper side view of the holder for a mobile electronic device in accordance with an embodiment of the invention.
Figure 38:
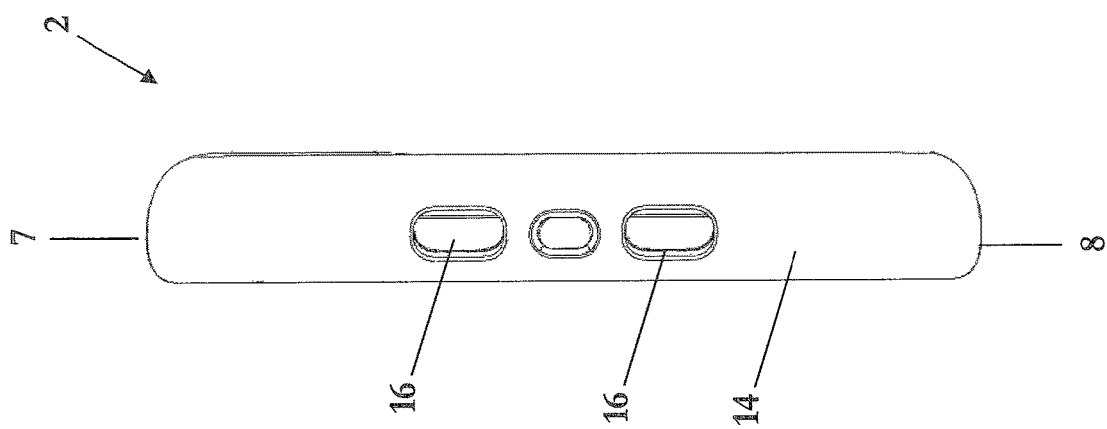
FIG. 38 is a right side view of the holder for a mobile electronic device in accordance with an embodiment of the invention.
Figure 37:
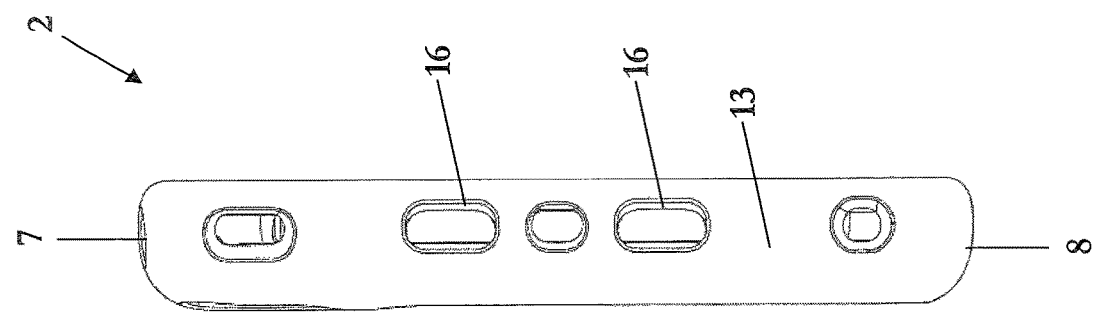
FIG. 37 is a left side view of the holder for a mobile electronic device in accordance with an embodiment of the invention.
Figure 41:
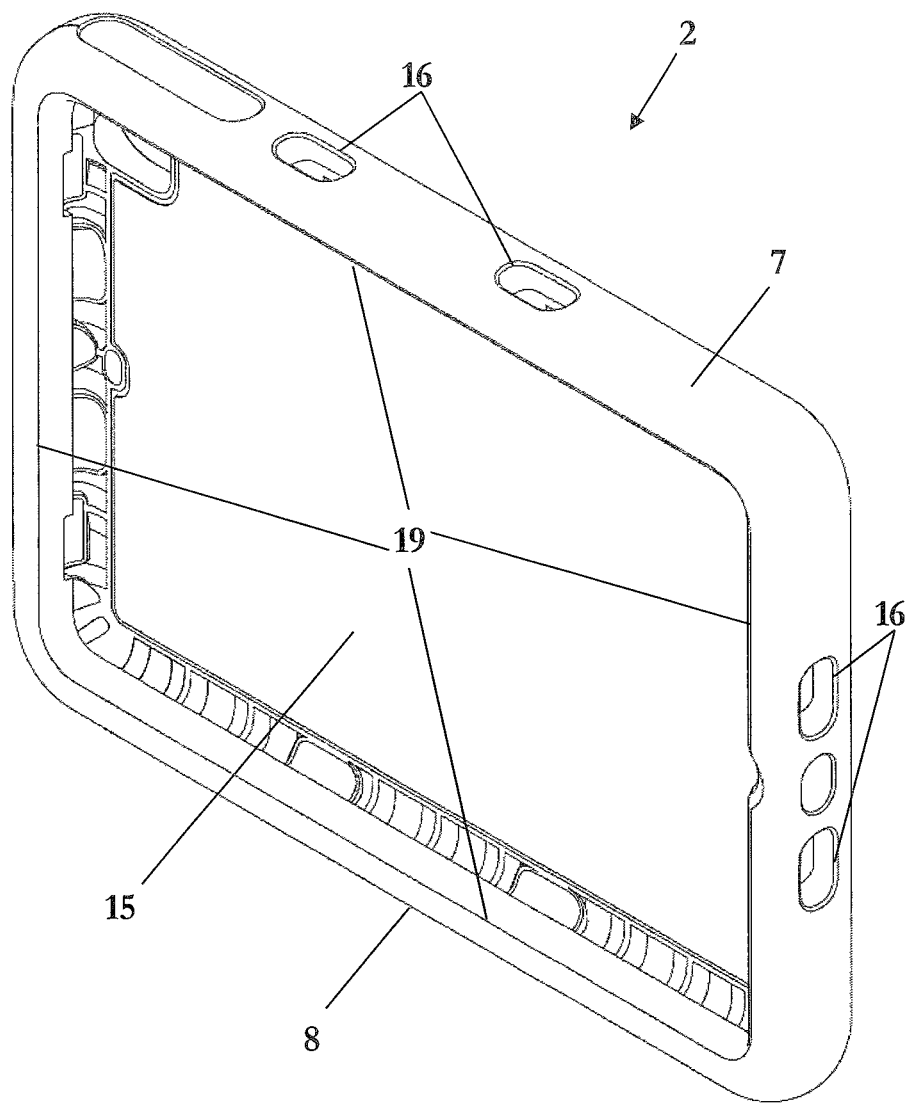
FIG. 41 is a front upper-side perspective view of the holder for a mobile electronic device in accordance with an embodiment of the invention.
Figure 42:
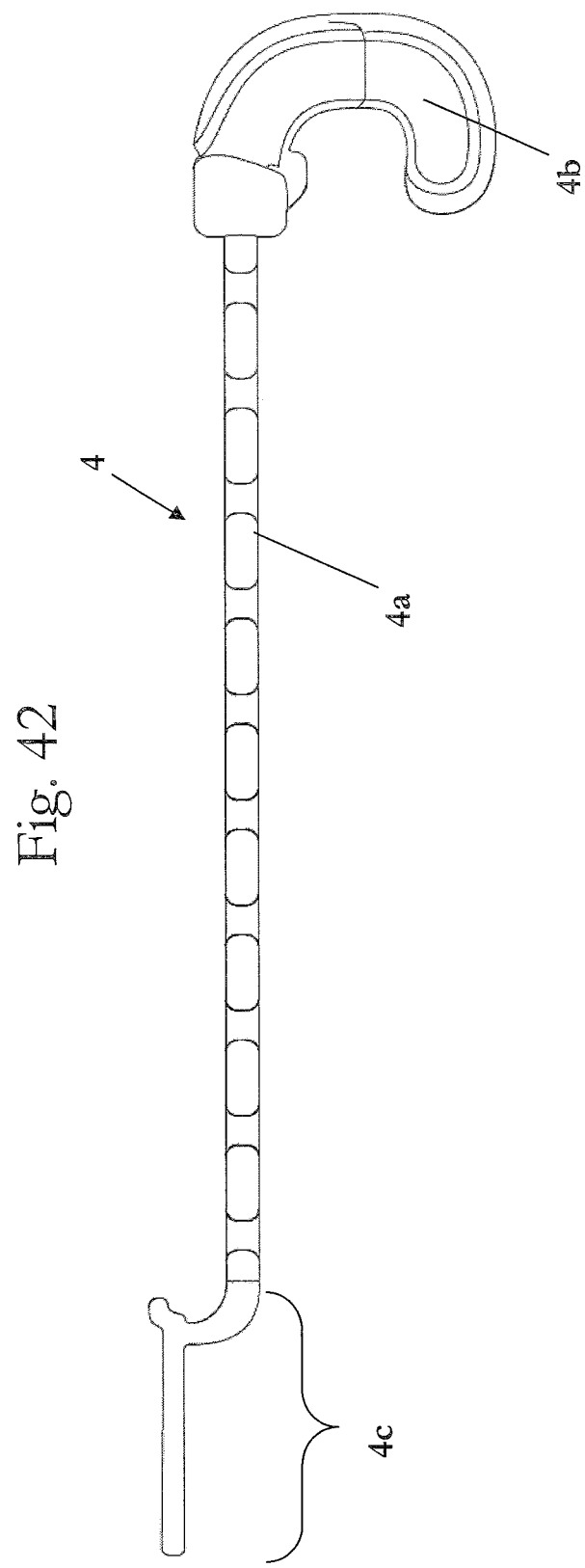
FIG. 42 is a upper side view of the right clamp piece for a mobile electronic device in accordance with an embodiment of the invention.
Figure 43:
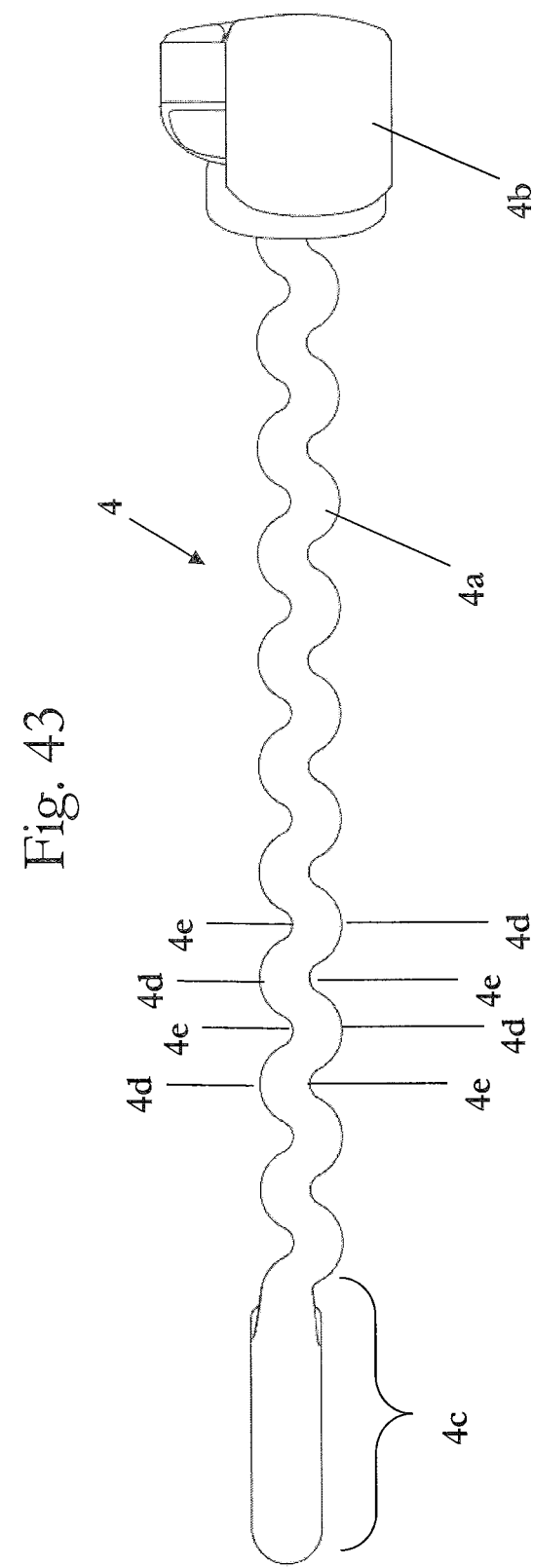
FIG. 43 is a front view of the right clamp piece for a mobile electronic device in accordance with an embodiment of the invention.
Figure 45:
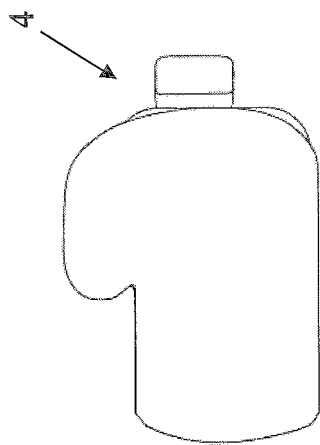
FIG. 45 is a right side view of the right clamp piece for a mobile electronic device in accordance with an embodiment of the invention.
Figure 44:
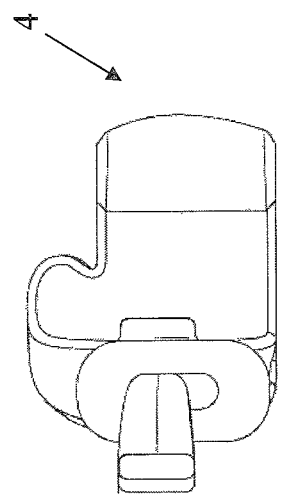
FIG. 44 is a left side view of the right clamp piece for a mobile electronic device in accordance with an embodiment of the invention.
Figure 46:
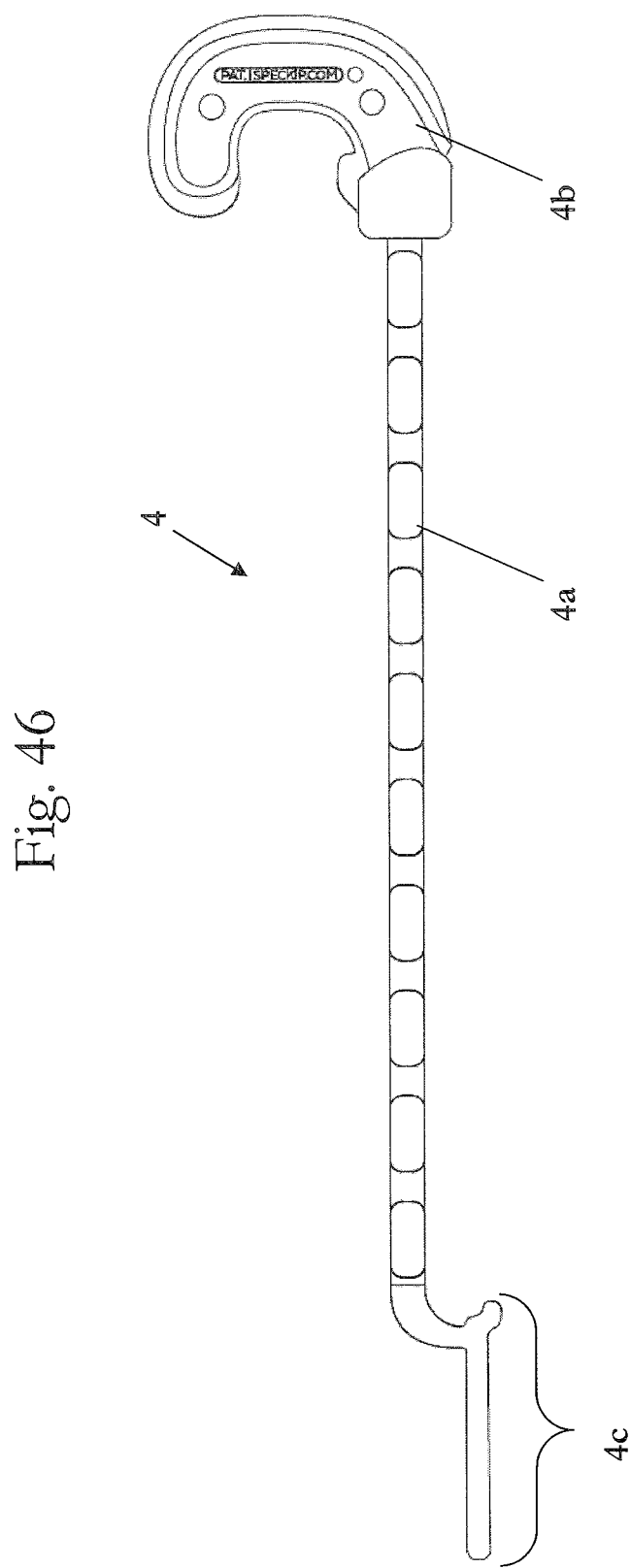
FIG. 46 is a lower side view of the right clamp piece for a mobile electronic device in accordance with an embodiment of the invention.
Figure 47:
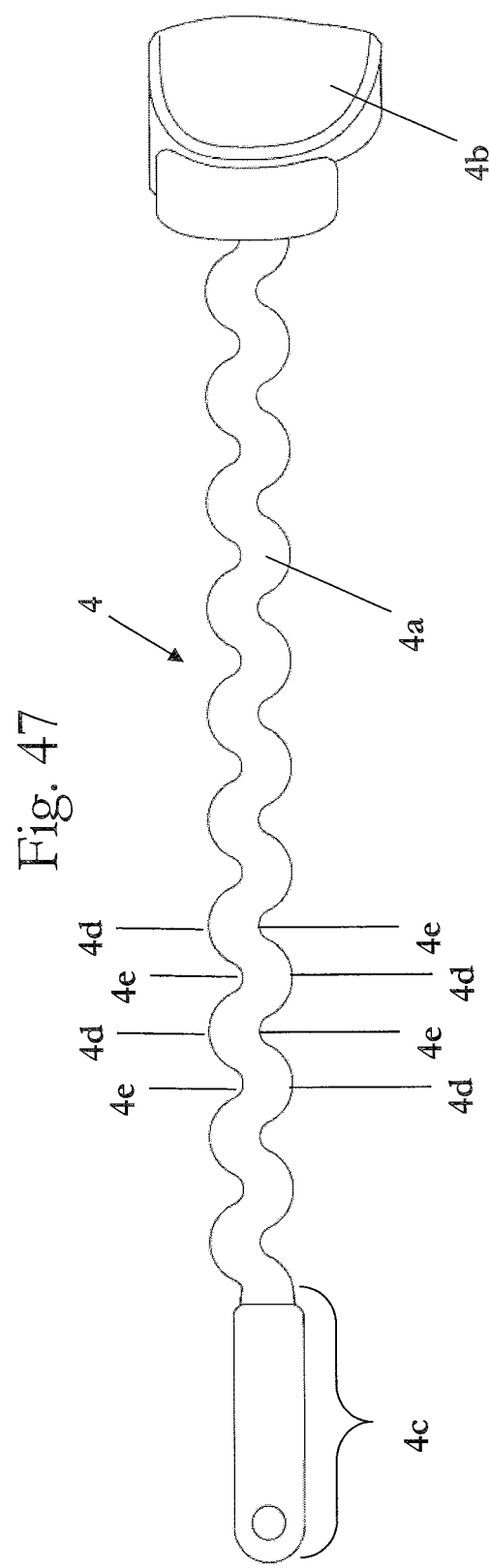
FIG. 47 is a rear view of the right clamp piece for a mobile electronic device in accordance with an embodiment of the invention.
Figure 48:
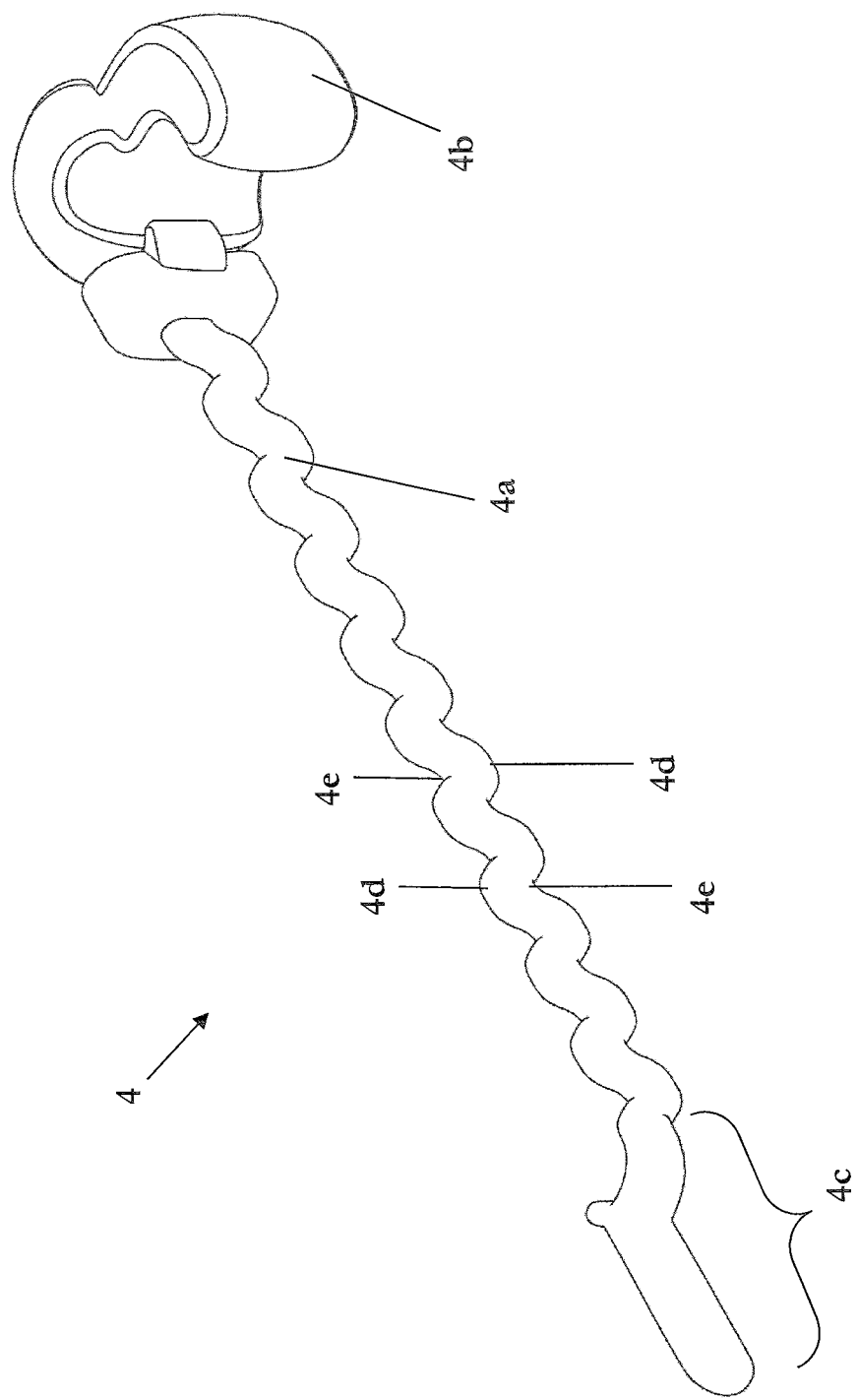
FIG. 48 is a front upper-side perspective view of the right clamp piece for a mobile electronic device in accordance with an embodiment of the invention.
Figure 52:
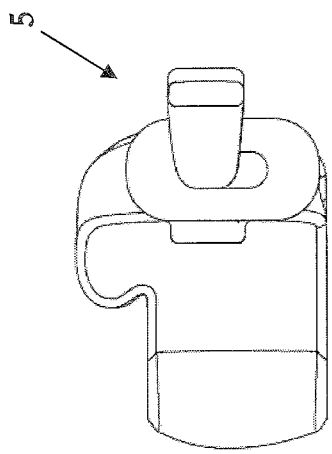
FIG. 52 is a right side view of the left clamp piece for a mobile electronic device in accordance with an embodiment of the invention.
Figure 51:
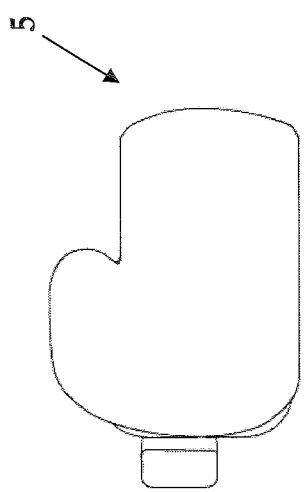
FIG. 51 is a left side view of the left clamp piece for a mobile electronic device in accordance with an embodiment of the invention.
Figure 53:
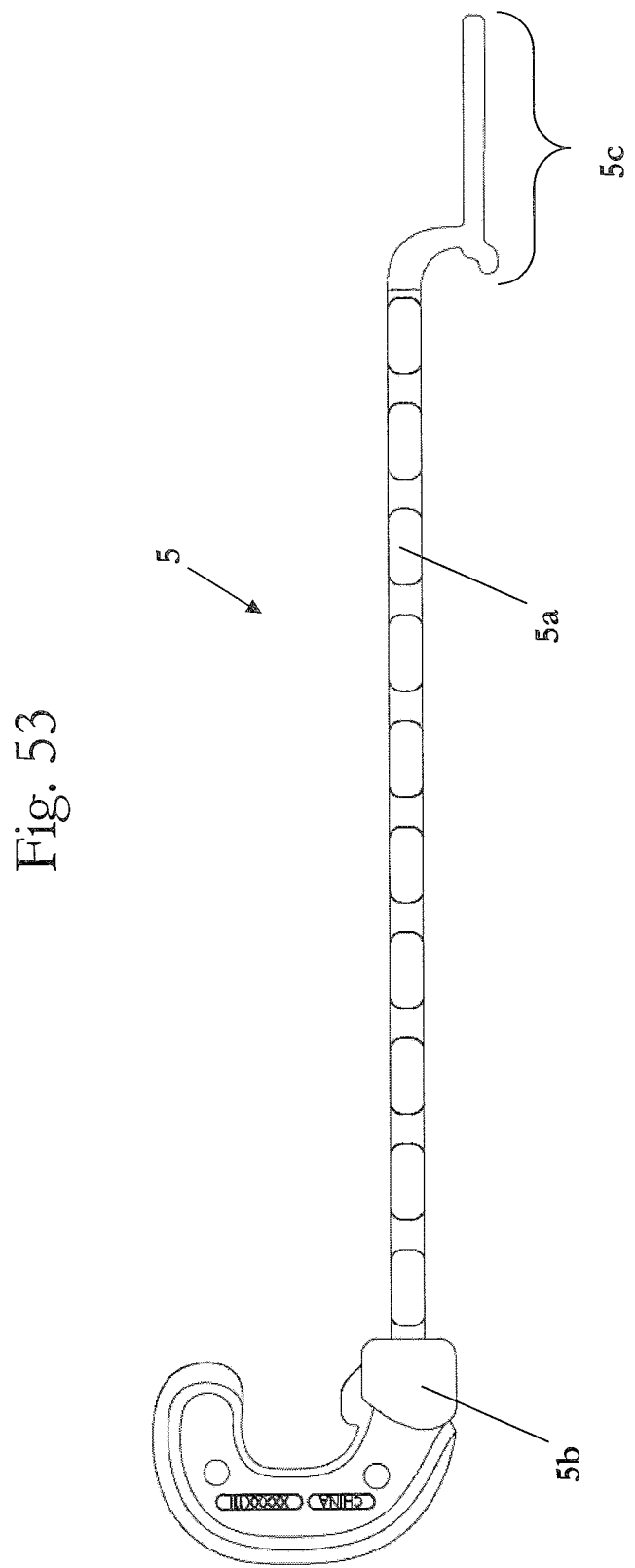
FIG. 53 is a lower side view of the left clamp piece for a mobile electronic device in accordance with an embodiment of the invention.
Figure 54:
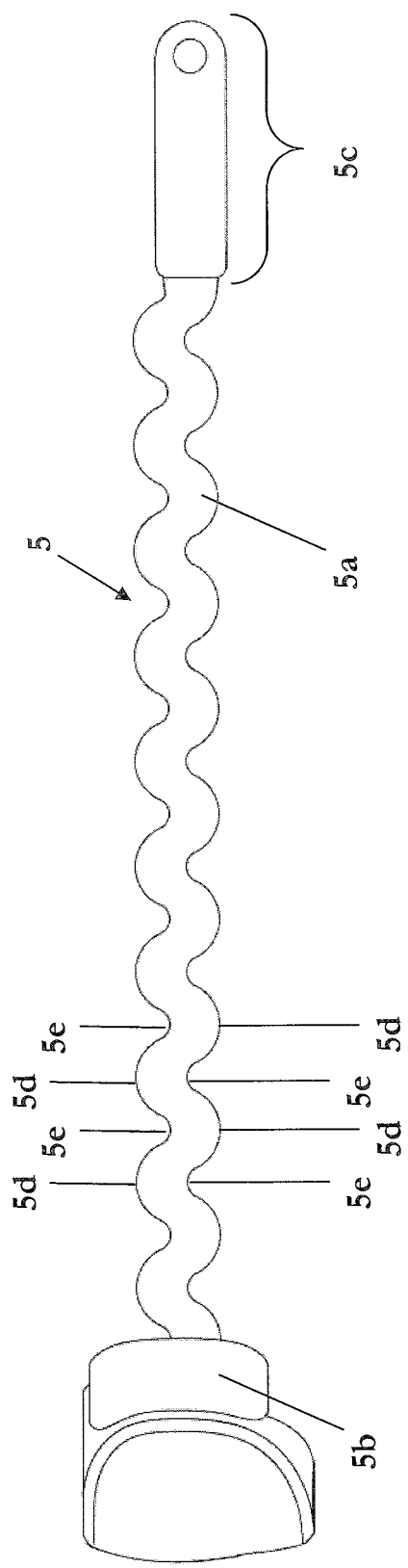
FIG. 54 is a rear view of the left clamp piece for a mobile electronic device in accordance with an embodiment of the invention.
Figure 55:
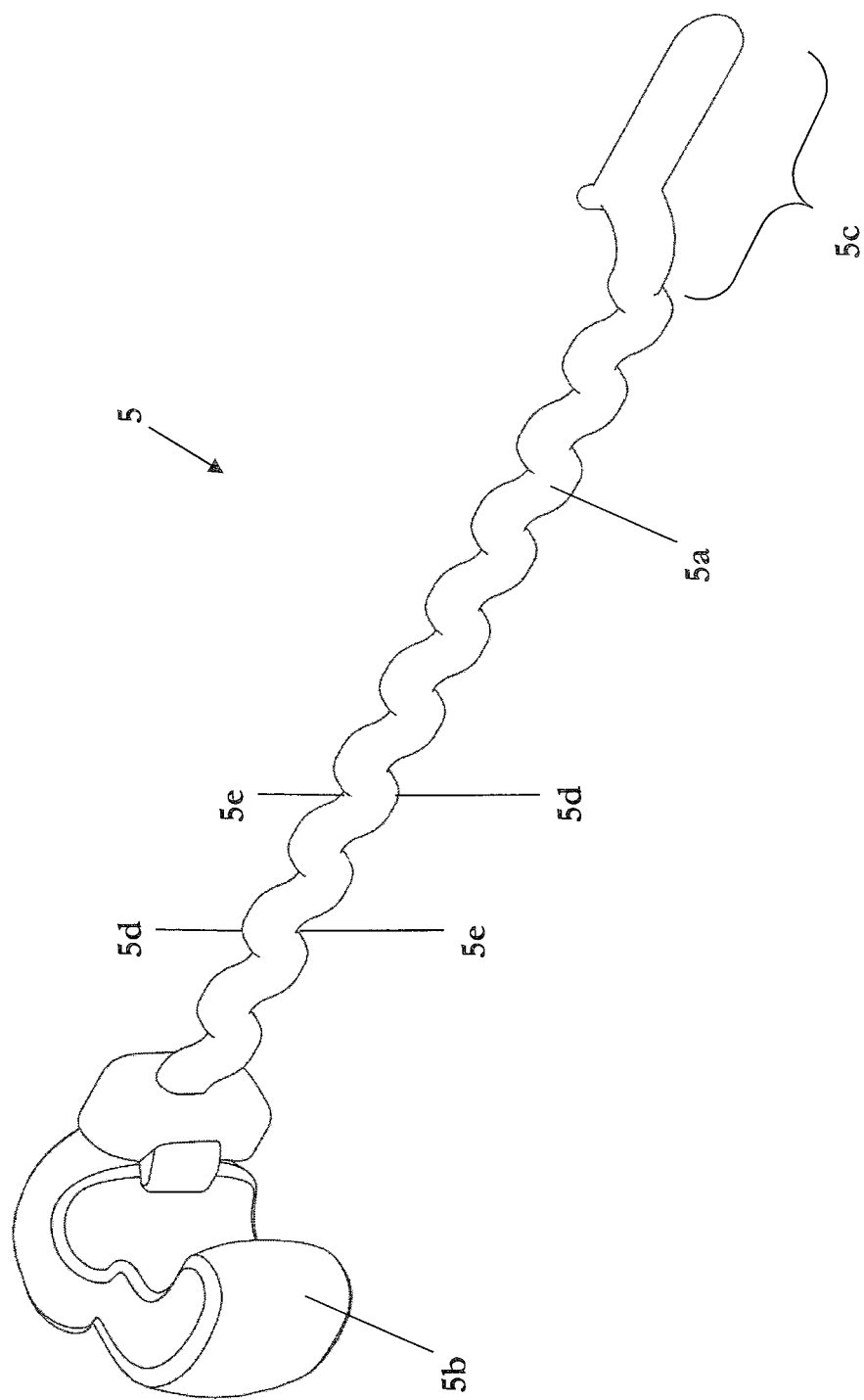
FIG. 55 is a front upper-side perspective view of the left clamp piece for a mobile electronic device in accordance with an embodiment of the invention.
Figure 56:
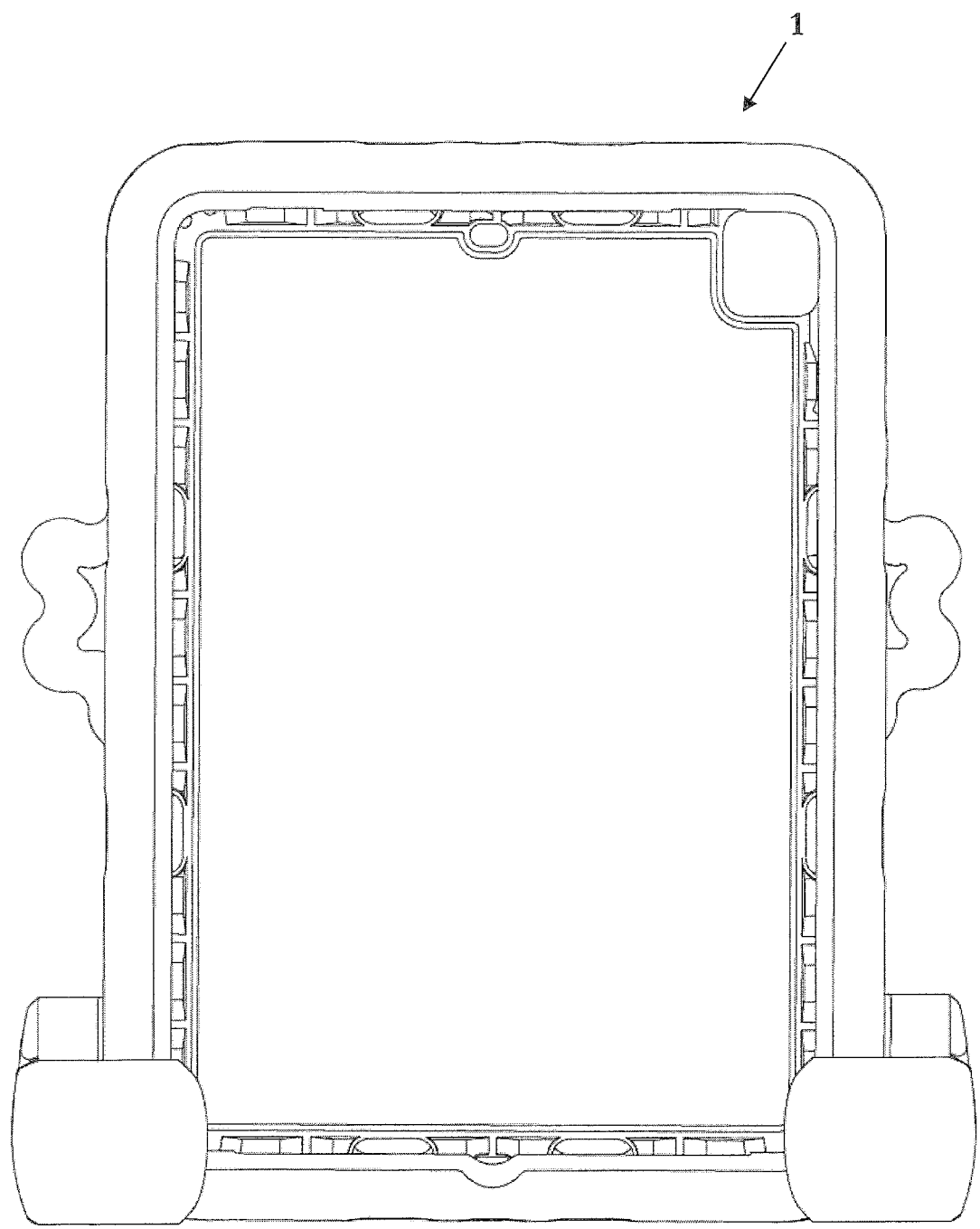
FIG. 56 is a front view of the holder for a mobile electronic device in accordance with an embodiment of the invention with the holder being in a portrait orientation, position, or state.
Figure 57:
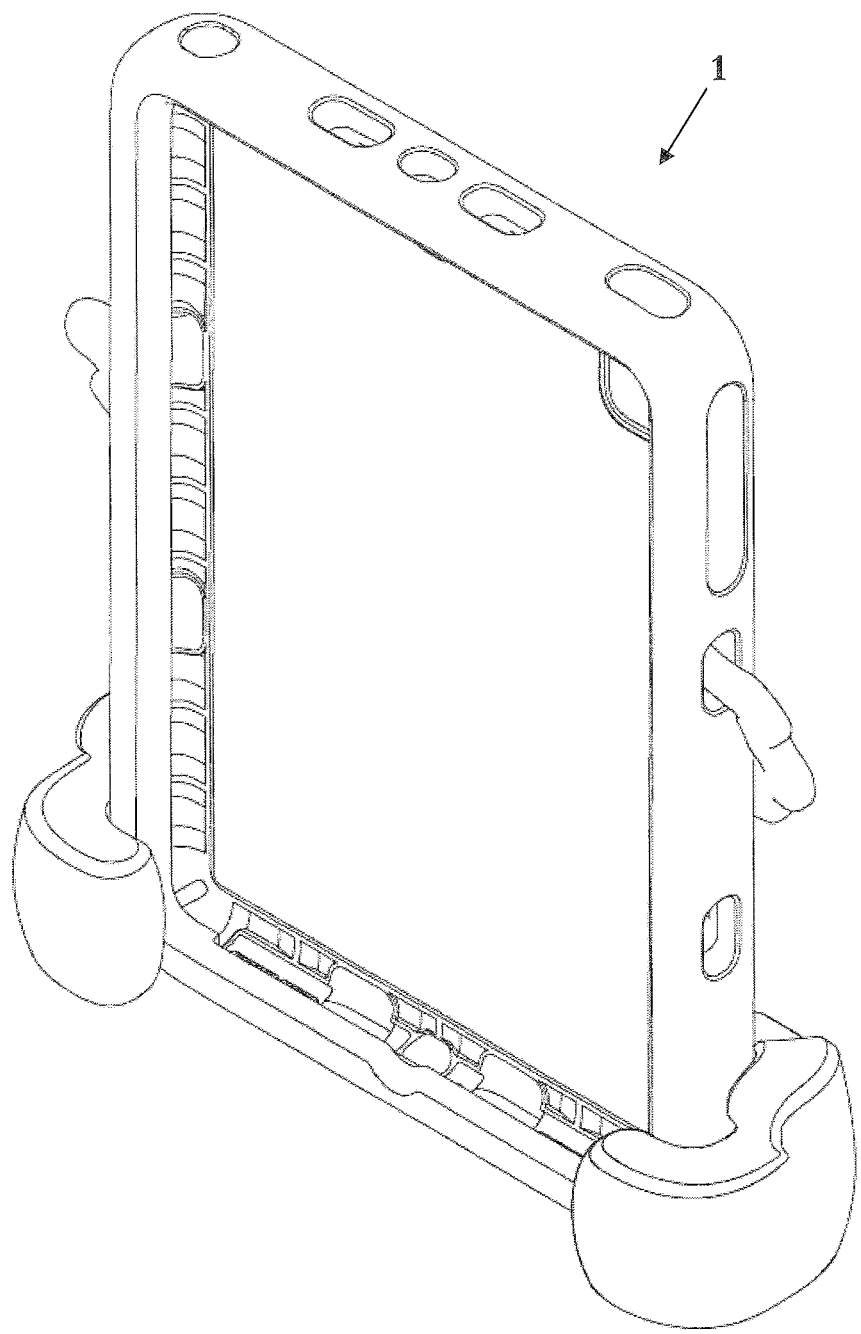
FIG. 57 is a front upper-left-side perspective view of the holder for a mobile electronic device in accordance with an embodiment of the invention with the holder being in the portrait orientation, position, or state.

For example, each of the upper side 7, the lower side 8, the left side 13, and the right side 14 of the case portion 2 in FIG. 28 has two sets of paired openings 16,17 compared to the one set on each of these sides in FIG. 1. Otherwise, the case portion 2 in FIGS. 28-41 has the same features as the case portion 2 in FIGS. 1-14.

As another example, the right clamp piece 4 and the left clamp piece 5 each include a flexible extension 4a,5a that extend from the clamping portion 4b,5b. Each clamp portion 4b,5b is configured to clamp onto, snap onto, click onto, or otherwise engage a side of the case portion 2 or a side of a mobile device so that the clamp piece 4,5 is secured to the side of the case portion 2 or the side of a mobile device.

Each clamp piece 4,5 also has a connecting portion 4c,5c located at an end of the flexible extension 4a,5a opposite to the clamping portions 4b,5b. Each connecting portion 4c,5c is configured to securely engage with and connect to the case portion 2 via a set of paired openings 16,17 so as to lock the connecting portion 4c,5c to the case portion 2, as shown in FIG. 33.

Figure 58:
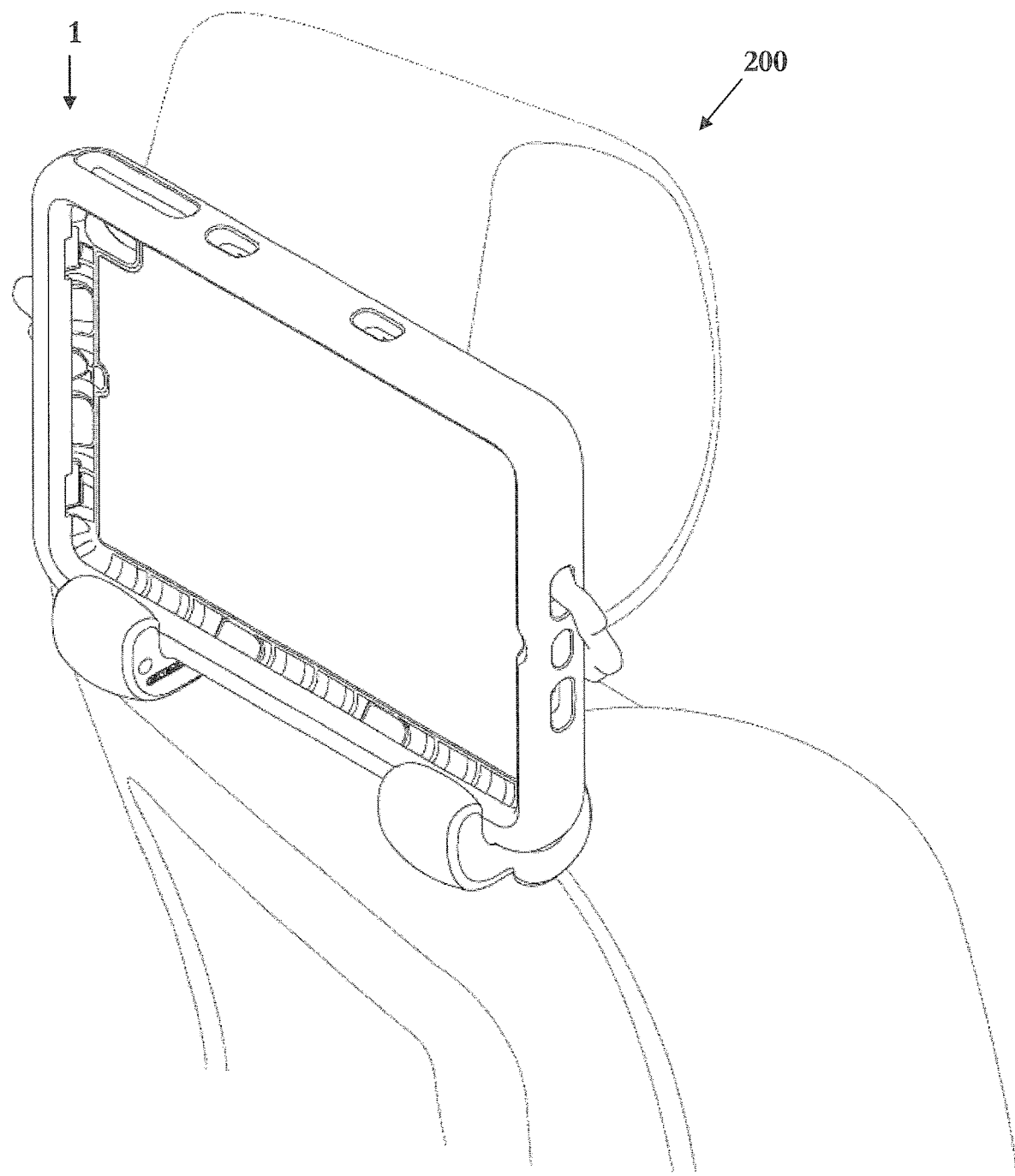
FIGS. 58 and 59 are views of the holder for a mobile electronic device in accordance with an embodiment of the invention with the holder being attached or connected to a headrest of a car.
Figure 59:
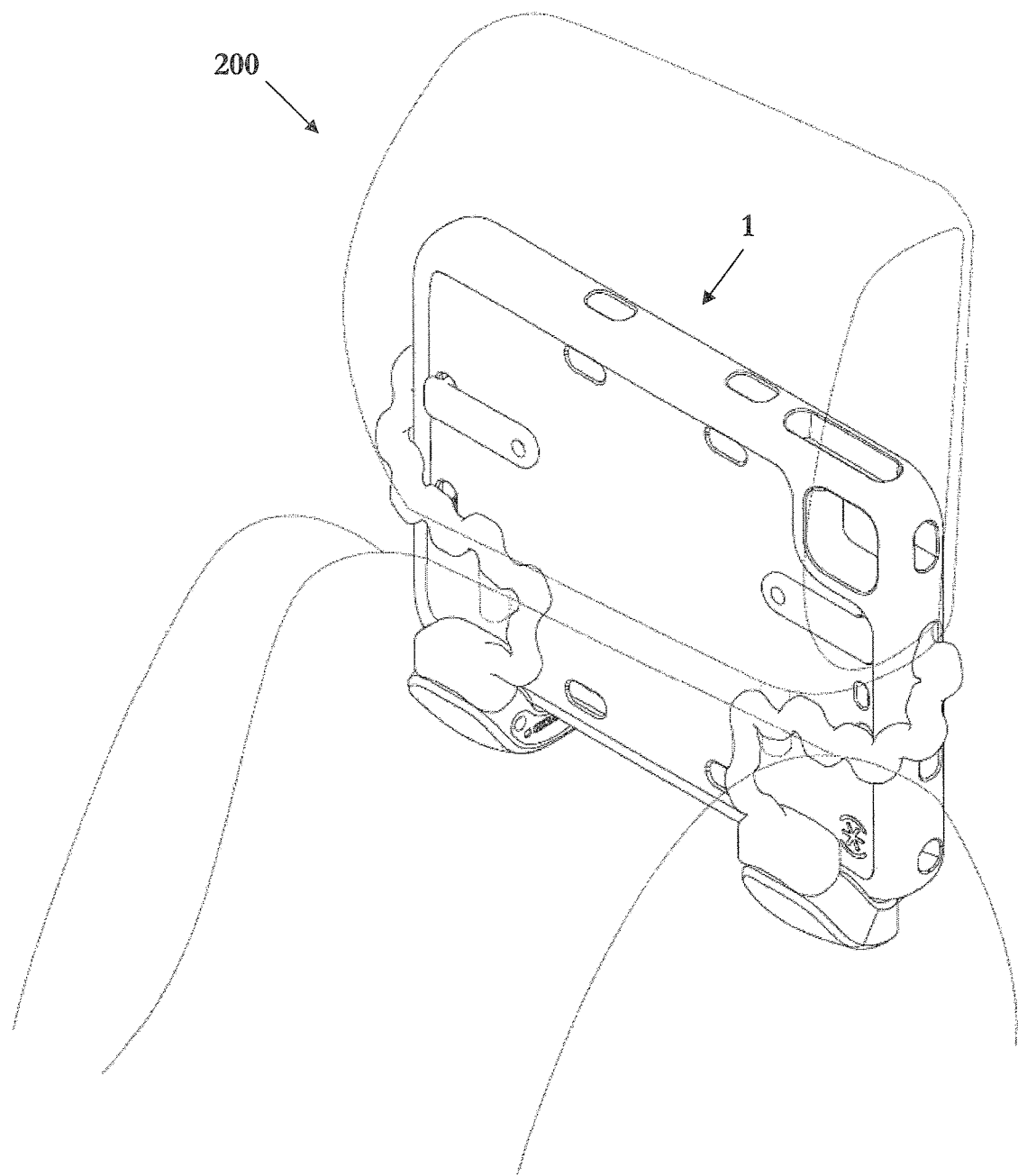

Preferably, each flexible extension 4a,5a is formed in an undulating pattern-like a wave, zig-zag, and the like-with alternating peaks 4d,5d and troughs 4e,5e. The peaks 4d,5d and troughs 4e,5e alternate in an extension direction from the clamping portion 4b,5b to the connecting portion 4c,5c. In the embodiment shown in FIGS. 43, 47, 50, and 54, each peaks 4d,5d also has a corresponding troughs 4e,5e on an opposite side of the flexible extension 4a,5a in a direction substantially perpendicular to the extension direction. The undulating pattern of peaks and troughs gives the flexible extensions 4a,5a added flexibility and elasticity to assist in securing the case portion 2 or mobile device to an object, such as a car headrest as shown in FIGS. 58 and 59. As seen in FIGS. 58 and 59, the flexible extensions 4a,5a and the connecting portion 4c,5c function and act in the same manner as the securing device 300 discussed above.

Preferably, each flexible extensions 4a,5a, clamping portion 4b,5b, and connecting portion 4c,5c are integral with each other to form a respective integral singular continuous clamp piece 4,5. More preferably, each clamp piece 4,5 is formed from a single uniform material.

It is noted that the terminology used above is for the purpose of reference only, and is not intended to be limiting. For example, terms such as "upper", "lower", "above", "below", "rightward", "leftward", "clockwise", and "counterclockwise" refer to directions in the drawings to which reference is made. As another example, terms such as "inward" and "outward" may refer to directions toward and away from, respectively, the geometric center of the component described. As a further example, terms such as "front", "rear", "side", "left side", "right side", "top", "bottom", "horizontal", and "vertical" describe the orientation of portions of the component within a consistent but arbitrary frame of reference which is made clear by reference to the text and the associated drawings describing the component under discussion. Such terminology will include the words specifically mentioned above, derivatives thereof, and words of similar import.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

In addition, it is noted that citation or identification of any document in this application is not an admission that such document is available as prior art to the present invention.

The invention claimed is:

1. A holder for a mobile electronic device that is configured to hold the mobile electronic device securely to an external object, the holder comprising:
   a case portion comprising:
      a plurality of first openings at an exterior of the case portion and a first communication path extending through the case portion that connects to each of the first openings; and
      a plurality of second openings at the exterior of the case portion and a second communication path extending through the case portion that connects to each of the second openings;
   first and second clamp pieces spaced apart from each other and configured for securely and removably attaching to a respective side of the case portion, each of the first and the second clamp pieces comprising:
      a clamping portion having opposing clamping surfaces configured for engagement with opposing surfaces on the respective side of the case portion so that the clamping portion is securely and removably attached to the respective side of the case portion;
      a flexible extension extending from the clamping portion and configured to be wrapped around the external object; and
      a connecting portion located at an end of the flexible extension opposite to the clamping portion,
   wherein the connecting portion of the first clamp piece securely engages with and connects to the case portion via the first openings and the first communication path and the connecting portion of the second clamp piece securely engages with and connects to the case portion via the second openings and the second communication path wherein:
      the flexible extension or the connecting portion of the first clamp piece extends through at least one of the first openings and the flexible extension or the connecting portion of the second clamp piece extends through at least one of the second openings;
      a portion of the flexible extension of the first clamp piece is arranged outside the case portion on a first side of the first openings and a portion of the flexible extension of the second clamp piece is arranged outside the case portion on a first side of the second openings; and
      a portion of the connecting portion of the first clamp piece is arranged outside the case portion on a second side of the first openings opposite the first side of the first openings and a portion of the connecting portion of the second clamp piece is arranged outside the case portion on a second side of the second openings opposite the first side of the second openings.

2. The holder for a mobile electronic device according to claim 1, wherein the case portion has:
   a pocket, recess, or cavity sized and configured to hold the mobile electronic device;
   a length dimension in a length direction;
   a width dimension in a width direction; and
   a thickness dimension in a thickness direction,
   wherein each of the length direction, the width direction, and the thickness direction is orthogonal to the other two of the length direction, the width direction, and the thickness direction, and
   wherein the thickness dimension is smaller than the width dimension and the width dimension is smaller than the length dimension.

3. The holder for a mobile electronic device according to claim 2, wherein the case portion further has a lip or rim that secures the mobile electronic device in the pocket, recess, or cavity.

4. The holder for a mobile electronic device according to claim 1, wherein each of the first and the second clamp pieces has an indentation or recess configured to accept the respective side of the case portion.

5. The holder for a mobile electronic device according to claim 1, wherein each of the flexible extensions is formed in an undulating pattern with alternating peaks and troughs.

6. The holder for a mobile electronic device according to claim 5, wherein, for each of the connecting portions, each of the peaks has a corresponding trough on an opposite side of the flexible extension in a direction substantially perpendicular to an extension direction defined in a direction from the clamping portion to the connecting portion.

7. The holder for a mobile electronic device according to claim 1, wherein the flexible extension, the clamping portion, and the connecting portion are integral with each other so that each of the clamp pieces is formed as an integral singular continuous clamp piece.

8. The holder for a mobile electronic device according to claim 1, wherein at least one of the first and the second clamp pieces is formed from at least one material selected from the group consisting of an elastomeric material, a foam material, a rubber material, silicone, thermoplastic elastomers ("TPEs"), thermoplastic polyurethane ("TPU"), polyolefins, a soft plastic, or any combination thereof.

9. The holder for a mobile electronic device according to claim 1, wherein each of the first and the second clamp pieces separately snaps onto the respective sides of the case portion.

10. A holder for a mobile electronic device that is configured to hold the mobile electronic device securely to an external object, the holder comprising:
    two first openings that are paired together as a first set of paired openings;
    a first communication path that connects the first openings so that a securing device can be fed into one of the first openings and subsequently fed out of the other of the first openings;
    two second openings that are paired together as a second set of paired openings;
    a second communication path that connects the second openings so that the securing device can be fed into one of the second openings and subsequently fed out of the other of the second openings;
    a case portion having a pocket, recess, or cavity sized and configured to hold the mobile electronic device, a length dimension in a length direction, a width dimension in a width direction, and a thickness dimension in a thickness direction, each of the length direction, the width direction, and the thickness direction being orthogonal to the other two of the length direction, the width direction, and the thickness direction, the thickness dimension being smaller than the width dimension, and the width dimension being smaller than the length dimension; and
    a securing device including first and the second clamp pieces, each of the first and the second clamp pieces being configured to engage a respective side of the case portion so that each of the first and the second clamp pieces is securely and removably attached to the respective side of the case portion and each comprising:
        a clamping portion configured to engage the respective side of the case portion so that the clamping portion is securely and removably attached to the respective side of the case portion;
        a flexible extension that extends from the clamping portion and includes a first portion and a second portion attached to the first portion; and
        a connecting portion located at an end of the flexible extension opposite to the clamping portion and including a first portion and a second portion attached to the first portion,
    wherein the two first openings are spaced apart from the two second openings so that the securing device can be secured to the holder at the first set of paired openings and at the second set of paired openings, and additionally wrapped around the external object to secure the holder to the external object,
    wherein each of the connecting portions securely engages with and connects to the case portion via a corresponding one of the first and the second sets of paired openings so that for each of the connecting portions:
        the first portion of the flexible extension or a first portion of the connecting portion is arranged in the corresponding one of the first and the second sets of paired openings;
        the second portion of the flexible extension is arranged outside the case portion on one side of the corresponding one of the first and the second sets of paired openings; and
    the second portion of the connecting portion is arranged outside the case portion on another side of the corresponding one of the first and the second sets of paired openings different from the one side.

11. A holder for a mobile electronic device that is configured to hold the mobile electronic device securely to an external object, the holder comprising:
    a case portion having a pocket, recess, or cavity sized and configured to hold the mobile electronic device, a length dimension in a length direction, a width dimension in a width direction, and a thickness dimension in a thickness direction, each of the length direction, the width direction, and the thickness direction being orthogonal to the other two of the length direction, the width direction, and the thickness direction, the thickness dimension being smaller than the width dimension, and the width dimension being smaller than the length dimension;
    two first openings formed in the case portion that are paired together as a first set of paired openings;
    a first communication path that connects the first openings so that a securing device can be fed into one of the first openings and subsequently fed out of the other of the first openings;
    two second openings formed in the case portion that are paired together as a second set of paired openings;
    a second communication path that connects the second openings so that the securing device can be fed into one of the second openings and subsequently fed out of the other of the second openings,
    two third openings that are paired together as a third set of paired openings;
    a third communication path that connects the third openings so that the securing device can be fed into one of the third openings and subsequently fed out of the other of the third openings;
    two fourth openings that are paired together as a fourth set of paired openings; and a fourth communication path that connects the fourth openings so that the securing device can be fed into one of the fourth openings and subsequently fed out of the other of the fourth openings, wherein the two first openings are spaced apart from the two second openings so that the securing device, which securing device comprises one or more separate items, can be secured to the holder at the first set of paired openings and at the second set of paired openings, and additionally wrapped around the external object to secure the holder to the external object, and wherein the two third openings are spaced apart from the two fourth openings so that the securing device can be secured to the holder at the third set of paired openings and at the fourth set of paired openings, and additionally wrapped around the external object to secure the holder to the external object.

12. The holder for a mobile electronic device according to claim 11, wherein the third and the fourth sets of paired openings are formed in the case portion.

13. The holder for a mobile electronic device according to claim 11, wherein the first set of paired openings is formed at a first length end of the case portion in the length direction, and wherein the second set of paired openings is formed at a second length end of the case portion in the length direction opposite to the first length end.

14. The holder for a mobile electronic device according to claim 11, wherein the first set of paired openings is formed at a first width end of the case portion in the width direction, and wherein the second set of paired openings is formed at a second width end of the case portion in the length direction opposite to the first width end.

15. The holder for a mobile electronic device according to claim 11, wherein the third openings are formed at a first width end of the case portion in the width direction, and wherein the fourth openings are formed at a second width end of the case portion in the length direction opposite to the first width end.

16. The holder for a mobile electronic device according to claim 11, wherein each of the openings is configured to accept at least one item selected from the group consisting of a string, a wire, a cord, an elastic cord, a bungee cord, a rope, a cable, and a strap as at least part of the securing device.

* * * * *